(12) United States Patent
Gharabegian

(10) Patent No.: US 10,349,493 B2
(45) Date of Patent: Jul. 9, 2019

(54) ARTIFICIAL INTELLIGENCE (AI) COMPUTING DEVICE WITH ONE OR MORE LIGHTING ELEMENTS

(71) Applicant: Shadecraft, Inc., Pasadena, CA (US)

(72) Inventor: Armen Sevada Gharabegian, Glendale, CA (US)

( * ) Notice: Subject to any disclaimer, the term of this patent is extended or adjusted under 35 U.S.C. 154(b) by 0 days.

(21) Appl. No.: 15/950,134

(22) Filed: Apr. 10, 2018

(65) Prior Publication Data

US 2019/0014643 A1 Jan. 10, 2019

Related U.S. Application Data

(60) Provisional application No. 62/530,054, filed on Jul. 7, 2017.

(51) Int. Cl.
*H05B 37/02* (2006.01)
*F21S 9/03* (2006.01)
*G06F 3/16* (2006.01)
*G10L 15/26* (2006.01)

(52) U.S. Cl.
CPC .......... *H05B 37/0236* (2013.01); *F21S 9/037* (2013.01); *G06F 3/167* (2013.01); *G10L 15/265* (2013.01); *G10L 15/26* (2013.01)

(58) Field of Classification Search
CPC ............ H05B 37/0218; H05B 37/0227; H05B 37/0236; H05B 37/0245; H05B 37/0272
USPC .................................................. 315/152, 307
See application file for complete search history.

(56) References Cited

U.S. PATENT DOCUMENTS

| | | | |
|---|---|---|---|
| 2,070,045 A | 2/1937 | Gilpin | |
| 2,087,537 A | 7/1937 | Finkel | |
| 2,960,094 A | 11/1960 | Small | |
| 4,174,532 A | 11/1979 | Kelley | |
| 4,684,230 A | 8/1987 | Smith | |
| 4,787,019 A | 11/1988 | Van den Broeke | |
| 4,915,670 A | 4/1990 | Nesbit | |

(Continued)

FOREIGN PATENT DOCUMENTS

| | | |
|---|---|---|
| CH | 203073199 | 7/2013 |
| CN | 102258250 | 11/2011 |

(Continued)

OTHER PUBLICATIONS

Written Opinion and International Search Report for PCT International Application No. PCTUS2018/046364, International Filing Date Aug. 10, 2018, dated Nov. 22, 2018.

(Continued)

*Primary Examiner* — Tung X Le

(57) ABSTRACT

A lighting system including a lighting support frame and lighting fabric and a lighting support assembly connected to the lighting support frame and lighting fabric, the lighting support frame or the lighting support assembly including one or more lighting elements. The lighting system further includes an artificial intelligence (AI) device housing coupled to the lighting support assembly, the AI device housing including one or more microphones, one or more processors, one or more memory devices, and computer-readable instructions stored in the one or more memory devices and executable by the one or more processors to receive audible commands and convert the received audible commands to one or more sound files.

18 Claims, 15 Drawing Sheets

(56) References Cited

U.S. PATENT DOCUMENTS

| | | |
|---|---|---|
| 5,007,811 A | 4/1991 | Hopkins |
| 5,029,239 A | 7/1991 | Nesbit |
| 5,275,364 A | 1/1994 | Burger et al. |
| 5,321,579 A | 6/1994 | Brown et al. |
| 5,349,975 A | 9/1994 | Valdner |
| 5,683,064 A | 11/1997 | Copeland et al. |
| 5,979,793 A | 11/1999 | Louis |
| 5,996,511 A | 12/1999 | Swoger |
| 6,017,188 A | 1/2000 | Benton |
| 6,027,309 A | 2/2000 | Rawls et al. |
| 6,113,054 A | 9/2000 | Ma |
| 6,134,103 A | 10/2000 | Ghanma |
| 6,138,970 A | 10/2000 | Sohrt et al. |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,412,889 B1 | 7/2002 | Hummell et al. |
| 6,439,249 B1 | 8/2002 | Spatafora et al. |
| 6,446,650 B1 | 9/2002 | Ma |
| 6,488,254 B2 | 12/2002 | Li |
| 6,511,033 B2 | 1/2003 | Li |
| 6,519,144 B1 | 2/2003 | Henrie et al. |
| 6,565,060 B2 | 5/2003 | Li |
| 6,585,219 B2 | 7/2003 | Li |
| 6,598,990 B2 | 7/2003 | Li |
| 6,636,918 B1 | 10/2003 | Aguilar et al. |
| 6,666,284 B2 | 12/2003 | Stirm |
| 6,785,789 B1 | 8/2004 | Kekre et al. |
| 6,840,657 B2 | 1/2005 | Tung |
| 6,959,996 B2 | 7/2005 | Ip |
| 6,961,237 B2 | 11/2005 | Dickie |
| 7,017,598 B2 | 3/2006 | Nipke |
| D518,629 S | 4/2006 | Ma |
| 7,034,902 B2 | 4/2006 | Tajima |
| 7,128,076 B2 | 10/2006 | Freedman |
| 7,134,442 B2 | 11/2006 | Ma |
| 7,134,762 B2 | 11/2006 | Ma |
| 7,143,501 B2 | 12/2006 | Bramson et al. |
| D539,632 S | 4/2007 | Ma |
| D558,444 S | 1/2008 | Ma |
| 7,412,985 B2 | 8/2008 | Ma |
| 7,493,909 B2 | 2/2009 | Ma |
| 7,497,225 B1 | 3/2009 | Klein, Jr. et al. |
| 7,497,583 B2 | 3/2009 | Ma |
| 7,533,680 B2 | 5/2009 | Ma |
| 7,559,520 B2 | 7/2009 | Quijano et al. |
| 7,593,220 B2 | 9/2009 | Proctor et al. |
| 7,604,015 B2 | 10/2009 | Fraser |
| 7,628,164 B2 | 12/2009 | Ma et al. |
| 7,650,230 B1 | 1/2010 | Laverick et al. |
| 7,703,464 B2 | 4/2010 | Ma |
| 7,708,022 B2 | 5/2010 | Ma |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,900,643 B2 | 3/2011 | Ma |
| 7,963,293 B2 | 6/2011 | Ma |
| 8,020,572 B2 | 9/2011 | Ma |
| 8,025,071 B2 | 9/2011 | Ma |
| 8,061,375 B2 | 11/2011 | Ma |
| 8,066,021 B2 | 11/2011 | Ma |
| 8,082,935 B2 | 12/2011 | Ma |
| D660,137 S | 5/2012 | Ma |
| 8,166,986 B2 | 5/2012 | Ma |
| 8,205,656 B2 | 6/2012 | Ma |
| 8,251,078 B2 | 8/2012 | Ma |
| 8,356,613 B2 | 1/2013 | Ma |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,657,246 B2 | 2/2014 | Ma |
| 8,919,722 B2 | 6/2014 | Ma |
| D719,342 S | 12/2014 | Ma |
| D719,343 S | 12/2014 | Ma |
| 8,919,361 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin |
| 9,192,215 B2 | 11/2015 | Ma |
| 9,220,325 B2 | 12/2015 | Ma |
| 9,237,785 B2 | 1/2016 | Ma |
| 9,241,549 B2 | 1/2016 | Ma |
| 9,289,039 B2 | 3/2016 | Akin |
| 9,510,653 B2 | 12/2016 | Akin |
| 9,629,426 B1 | 4/2017 | Fan |
| 2001/0001083 A1 | 5/2001 | Helot |
| 2002/0074027 A1 | 6/2002 | Maidment |
| 2004/0240167 A1 | 12/2004 | Ledbetter et al. |
| 2005/0016571 A1 | 1/2005 | Wu |
| 2005/0072451 A1 | 4/2005 | Vivian et al. |
| 2005/0161067 A1 | 7/2005 | Hollins |
| 2006/0124122 A1 | 6/2006 | Young et al. |
| 2006/0127034 A1 | 6/2006 | Brooking et al. |
| 2006/0196532 A1 | 9/2006 | Tung |
| 2007/0040647 A1 | 2/2007 | Saenz |
| 2007/0070588 A1 | 3/2007 | Lin |
| 2007/0126208 A1 | 6/2007 | Freedman |
| 2007/0242450 A1 | 10/2007 | Blatecky |
| 2007/0279856 A1 | 12/2007 | Bragg |
| 2007/0286463 A1 | 12/2007 | Ritzau et al. |
| 2008/0092936 A1 | 4/2008 | Carabillo |
| 2008/0262657 A1 | 10/2008 | Howell et al. |
| 2009/0056775 A1 | 3/2009 | Kuelbs |
| 2009/0071516 A1 | 3/2009 | Li |
| 2009/0193578 A1 | 8/2009 | Jang et al. |
| 2009/0250982 A1 | 10/2009 | Cohen |
| 2009/0277486 A1 | 12/2009 | Stepaniuk et al. |
| 2010/0012164 A1 | 1/2010 | Stoelinga |
| 2010/0097441 A1 | 4/2010 | Trachtenberg et al. |
| 2010/0204841 A1 | 8/2010 | Chemel et al. |
| 2010/0245503 A1 | 9/2010 | Li |
| 2010/0295456 A1* | 11/2010 | Ko ............... H05B 33/0869 |
| | | 315/154 |
| 2010/0320819 A1 | 12/2010 | Cohen et al. |
| 2011/0157801 A1 | 6/2011 | Satterfield |
| 2012/0029704 A1 | 2/2012 | Ackermann |
| 2012/0038279 A1* | 2/2012 | Chang ............ F21V 23/0442 |
| | | 315/151 |
| 2013/0073283 A1 | 3/2013 | Kenwood |
| 2014/0167624 A1* | 6/2014 | Sheu ............. H05B 33/0854 |
| | | 315/158 |
| 2014/0317168 A1 | 10/2014 | Suresh |
| 2015/0043202 A1 | 2/2015 | Kosedag |
| 2015/0116485 A1 | 4/2015 | Subramanian |
| 2015/0255853 A1 | 9/2015 | Apple |
| 2015/0362137 A1* | 12/2015 | Izardel ............. F21K 9/232 |
| | | 362/183 |
| 2016/0153650 A1* | 6/2016 | Chien ............ F21V 33/0004 |
| | | 362/253 |
| 2016/0184993 A1 | 6/2016 | Brandwijk |
| 2016/0326765 A1 | 11/2016 | Barbret |
| 2016/0338457 A1 | 11/2016 | Gharabegian |

(56) References Cited

U.S. PATENT DOCUMENTS

| | | | |
|---|---|---|---|
| 2018/0020530 A1* | 1/2018 | Scordato | H05B 37/0236 |
| 2018/0177029 A1* | 6/2018 | Wang | H05B 37/0236 |

FOREIGN PATENT DOCUMENTS

| | | |
|---|---|---|
| CN | 103405009 | 11/2013 |
| CN | 104469162 | 3/2015 |
| CN | 104835334 | 8/2015 |
| CN | 105193034 | 12/2015 |
| CN | 205089186 | 3/2016 |
| CN | 201580588 | 4/2016 |
| CN | 202974544 | 6/2016 |
| CN | 106163041 | 11/2016 |
| EP | 1731055 | 12/2006 |
| EP | 2479375 | 7/2012 |
| FR | 2977457 | 1/2013 |
| GB | WO2005092140 | 10/2005 |
| GR | 20060100244 | 11/2007 |
| RU | 12174 | 12/1999 |
| WO | WO 2003073884 | 9/2003 |
| WO | WO 2004103113 | 12/2004 |
| WO | WO 2006059334 | 6/2006 |
| WO | WO 2008102403 | 8/2008 |
| WO | WO 2009124384 | 10/2009 |
| WO | 2010098735 | 9/2010 |
| WO | WO2011/115418 | 9/2011 |
| WO | 2011140557 | 11/2011 |
| WO | WO2016/174312 | 11/2016 |
| WO | WO 2017/127845 | 7/2017 |

OTHER PUBLICATIONS

Written Opinion and International Search Report for PCT International Application No. PCTUS2018/045435, International Filing Date Aug. 6, 2018, dated Nov. 22, 2018.

Written Opinion and International Search Report for PCT International Application No. PCTUS2018/047010, International Filing Date Aug. 19, 2018, dated Nov. 22, 2018.

Written Opinion and International Search Report for PCT International Application No. PCT/US2018/041080, Federal Institute of Industrial Property, International Filing Date Jul. 6, 2018, dated Oct. 11, 2018.

Written Opinion and International Search Report for PCT International Application No. PCT/US2018/028281, Federal Institute of Industrial Property, International Filing Date Apr. 19, 2018, dated Sep. 13, 2018.

Written Opinion and International Search Report for PCT International Application No. PCT/US2018/030169, Federal Institute of Industrial Property, International Filing Date Apr. 30, 2018, dated Aug. 9, 2018.

GPS Sun Tracking Solar Panel; Alyammahi et al., published May 7, 2015, accessed Jun. 21, 2017 from https:repository.lib.fit.edu/handle/11141/628?show=full.

International Search Report and Written Opinion of International Searching Authority, International Application No. PCT/US2017/045059, dated Jan. 25, 2018.

Interntional Search Report and Written Opinion of International Searching Authority, International Application No. PCT/US2017/043789, dated Nov. 23, 2017.

International Search Report and Written Opinion of International Searching Authority Application No. PCT/US2017/052595, dated Feb. 21, 2018.

International Search Report, PCT Application No. PCT/US2017/068771, dated May 10, 2018, Federal Institute of Industrial Property, Authorized Officer, A. Chekalkina.

* cited by examiner

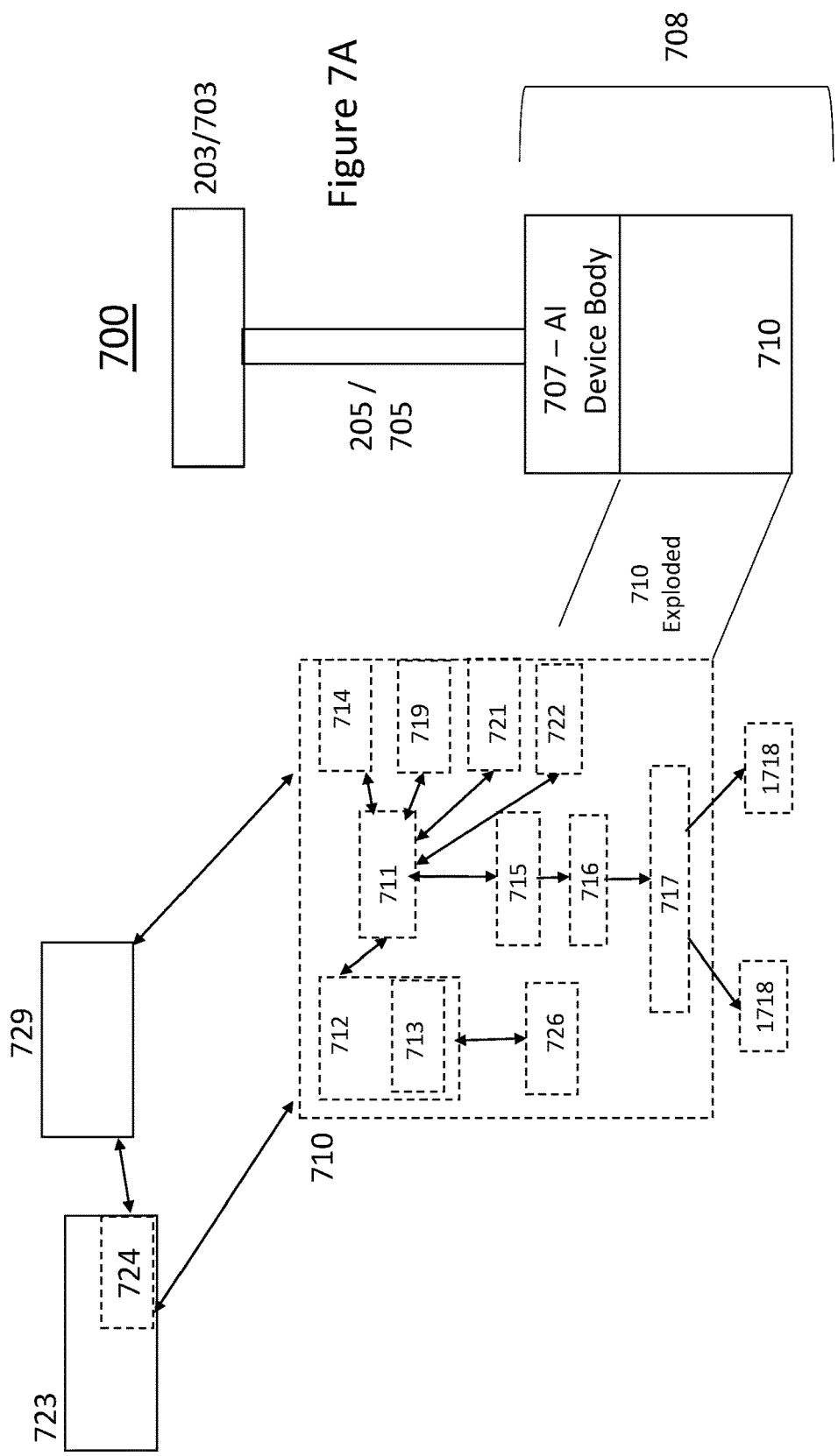

ARTIFICIAL INTELLIGENCE (AI) COMPUTING DEVICE WITH ONE OR MORE LIGHTING ELEMENTS

RELATED APPLICATIONS

This application claims priority to and is related to U.S. provisional patent application Ser. No. 62/530,054, filed Jul. 7, 2017, entitled "Artificial Intelligence (AI) Computing Device with One or More Lighting Elements," the disclosure of which is hereby incorporated by reference.

BACKGROUND

1. Field

The subject matter disclosed herein relates to an artificial intelligence computing device that comprises a computing device housing and one or more lighting elements.

2. Information/Background of the Invention

Conventional artificial intelligence computing devices have limitations based on being utilized indoors. Indoor AI computing devices cannot operate in outdoor environments because they do not have shade. In addition, space is at a premium in outdoor environments and current AI devices do not have lighting elements to provide light to users for reading and/or operating electronic devices. Accordingly, a need exists for AI computing devices that may be utilized in outdoor environments.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 7A illustrates an AI Device and Lighting System with a movable base assembly according to embodiments;

DETAILED DESCRIPTION

Figure 1:
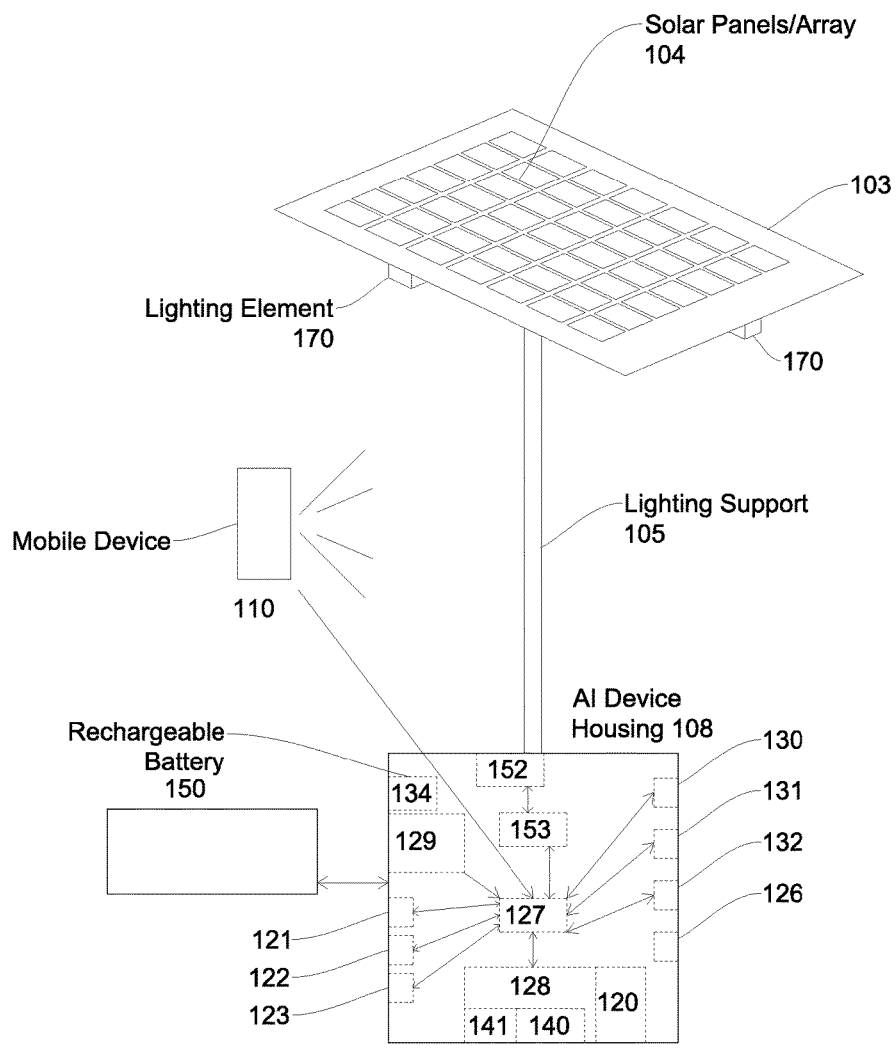
FIG. 1 illustrates an artificial intelligence device and lighting system according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, details, modules, assemblies, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example, and/or also via a wired network.

A network may comprise two or more network and/or computing devices and/or may couple network and/or computing devices so that signal communications, such as in the form of signal packets, for example, may be exchanged, such as between a server and a client device and/or other types of devices, including between wireless devices coupled via a wireless network, for example. In embodiments, one or more servers and/or clients may be coupled and/or connected via a wired network.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments.

Computing devices, mobile computing devices, and/or network devices capable of operating as a server, or otherwise, may include, as examples, rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, application data servers, proxy servers, and/or portions thereof, as appropriate.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context. In a context of this application, if signals, instructions, and/or commands are transmitted from one component (e.g., a controller or processor) to another component (or assembly), it is understood that messages, signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, an analog-to-digital converter, a digital-to-analog converter, another controller and/or processor, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module, and/or a number of other electrical assemblies and/or components.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as 1) time of day at which an image was captured, latitude and longitude of an image capture device, such as a camera; 2) time and day of when a sensor reading (e.g., humidity, temperature, air quality, UV radiation) was received; and/or 3) operating conditions of one or more motors or other components or assemblies in an AI device and lighting elements. Claimed subject matter is intended to embrace meaningful, descriptive parameters in any format, so long as the one or more parameters comprise physical signals and/or states, which may include, as parameter examples, name of the collection of signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a computing device may be installed within or as part of an artificial intelligence system having a shading element or structure. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as an artificial intelligence computing device). In the context of this specification, therefore, a special purpose computer or a similar special purpose electronic computing device (e.g., an AI computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an AI computing device with a shading element and/or shading structure, an AI device with a shading element, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun UltraSPARC, Linux-based processors, low power processors, Qualcomm Snapdragon processor, or Hewlett-Packard PA-RISC processor, but may be any type of application-specific and/or specifically designed processor or controller. In embodiments, a processor and/or controller may be connected to other system elements, including one or more memory devices, by a bus, a mesh network or other mesh components. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems, iOS, Android, Microsoft Phone, etc.), microcomputer operating systems, single board computer operating systems, and/or a UNIX operating systems. Embodiments are not limited to any particular implementation and/or operating system.

The specification may refer to an artificial intelligence (AI) computing device having a lighting element. In embodiments, an AI device with a lighting elements or an AI device and lighting system may allow an operator or user to verbally or audibly interface with the AI device and cause one or more lighting devices and/or one or more lighting elements to provide illumination and/or lighting coverage for an AI device and/or a surrounding area. In embodiments, an AI device may refer to the device's ability to receive an operator's verbal or audible commands and perform actions based on the received verbal and/or audible commands. This allows an AI device with one or more lighting elements may allow an AI device to be utilized outside and/or in low light situations. In embodiments, an AI device comprising one or more lighting devices may further comprise one or more solar cells and/or solar arrays to generate power for operation of the AI device and lighting system. In embodiments, the one or more solar cells and/or solar arrays may generate additional power than what is needed to operate an AI device and lighting system and additional power may be stored in a rechargeable device (e.g., a rechargeable battery) and/or transferred to additional rechargeable devices, which may be coupled and/or connected to a power generating AI device and lighting system. In embodiments, a AI device and lighting system may be referred to as an AI computing device and/or lighting system.

In embodiments, one or more solar cells and/or solar arrays may be disposed and/or placed on a surface of a support structure or frame and one or more lighting elements may be placed on a surface of a support structure or frame. In embodiments, solar cells and/or solar arrays may be placed on a top surface of a support structure or frame and one or more lighting elements may be placed on a bottom surface of a support structure or frame. In embodiments, a lighting support frame or lighting frame assembly may be comprised of plastic, metal, wood, composite materials, or a combination thereof. In embodiments, an AI device (or AI device housing); a lighting support assembly or lighting support stem; and/or a lighting support frame or lighting frame assembly may be an automated and/or intelligent and may respond to commands, instructions and/or signals generated by a processor and/or controller upon execution of computer-readable instructions in response to commands or instructions audibly spoken by a user and/or operator. In embodiments, a lighting element support frame or lighting frame assembly may be connected and/or coupled to an AI device housing via a lighting support assembly, a central support assembly, a stem assembly, a lighting support assembly, and/or a tube.

FIG. 1 illustrates an artificial intelligence device and lighting system according to embodiments. In embodiments, an artificial intelligence (AI) computing device 100 having one or more lighting elements may comprise a lighting support frame, a lighting frame, a lighting frame assembly and/or lighting fabric 103, a lighting support assembly or lighting support stem 105, and an AI device housing 108.

In embodiments, a lighting support frame and lighting fabric 103 may provide illumination and/or lighting to keep an AI device housing 108 illuminated in dark environments (e.g., evening environment or bad weather environments). In embodiments, a lighting support frame and/or lighting fabric 103 may also protect an AI shading device housing 108 from other environmental conditions (e.g., rain, sleet, snow, etc.). In embodiments, an AI lighting device housing 108 may be coupled and/or connected to a lighting support assembly or lighting stem assembly 105. In embodiments, a lighting support assembly 105 may support a lighting support frame and/or lighting fabric 103 and/or may move a lighting support frame and/or lighting fabric 103 into position with respect to an AI lighting device housing 108. In this illustrative embodiment of FIG. 1, an AI lighting device housing 108 may be utilized as a base, mount and/or support for a lighting support frame and/or lighting fabric 103. In embodiments, a lighting support assembly or lighting support stem 105 may be simple, may not have a tilting assembly and/or may not be adjustable in terms of elevation and/or rotation. In embodiments, a lighting support assembly or stem assembly 105 may be simplified and not have many electronics, components and/or assemblies installed and/or positioned therein. In embodiments, a lighting support assembly or lighting support stem 105 may also not include an expansion and sensor assembly. Illustratively, in embodiments, a lighting support assembly or lighting support stem 105 may not comprise an integrated computing device, may not have lighting assemblies and/or may not have sensors installed therein and/or positioned thereon. In embodiments, a lighting frame and/or lighting fabric 103 or a lighting support assembly or lighting support stem 105 may comprise one or more sensors (e.g., environmental sensors 121, directional sensors 122 and/or proximity sensors 123 although this location is not shown in FIG. 1; instead the sensors are located in an AI device housing 108). For example, in embodiments, environmental sensors 121 may be a temperature sensor, a wind sensor, a humidity sensor, an air quality sensor, and/or an ultraviolet radiation sensor. In embodiments, a lighting support frame and/or lighting fabric 103, and/or a lighting support assembly or lighting support stem 105 may comprise one or more imaging devices 126 (e.g., cameras). In embodiments, a lighting support assembly or lighting support stem 105 may not include an audio system (e.g., a speaker 153 and/or an audio/video transceiver 152) and may not include lighting assemblies to providing lighting and/or illumination to an environment surrounding an AI and lighting system 100. In embodiments, an AI device housing 108 may not include one or more lighting assemblies, one or more imaging devices, one or more sensors, and/or one or more integrated computing devices. In embodiments, an AI lighting device housing 108 may comprise one or more lighting assemblies, one or more imaging devices, one or more sensors, and/or one or more integrated computing devices.

In embodiments, an AI lighting device housing or AI device housing 108 may comprise a computing device 120 (e.g., such as a raspberry PI, a single-board computing device, Linux-based computing devices, etc.). In embodiments, an AI lighting device housing 108 may comprise one or more processors/controllers 127, one or more memory modules 128, one or more microphones (or audio receiving devices) 129, one or more PAN transceivers 130 (e.g., BLUETOOTH transceivers), one or more wireless transceivers 131 (e.g., WiFi or other 802.11 transceivers), and/or one or more cellular transceivers 132 (e.g., EDGE transceiver, 4G, 3G, CDMA and/or GSM transceivers). In embodiments, one or more processors 127, one or more memories 128, one or more transceivers 130 131 132 and/or one or more microphones 129 may be integrated into a single-board computing device 120, which allows for significantly reduced space, where in other embodiments, a single-board computing device 120 (e.g., Raspberry Pi or other Linux-based device) may not be utilized and processors 127 and/or memory devices 128 may be installed separately within an AI device housing 108. In embodiments, one or more memory modules 128 may contain computer-readable instructions 140, the computer-readable instructions 140 being executed by one or more processors/controllers 127 to perform certain functionality and/or execute certain actions. In embodiments, the computer-readable instructions may comprise an artificial intelligence (AI) application programming interface (API) 141. In embodiments, an artificial intelligence API 141 may allow communications and/or interfacing between an AI lighting device housing 108 and a third party artificial intelligence (AI) engine housed in a local and/or remote server and/or computing device (e.g., computing device 150). In embodiments, an AI API 141 may comprise or include a voice recognition AI API, which may be able to communicate sound files (e.g., analog or digital sound files) to a third party voice recognition AI server 150. In embodiments, a voice recognition AI server may be an Amazon Alexa, Echo, Echo Dot and/or a Google Now server or other third party voice recognition AI servers. In embodiments, an AI engine and/or an AI voice recognition (e.g., computer-readable instructions 140 stored in one or more memories 128 and executed by one or more processors 127 performing AI functions and/or AI voice recognition functions) may be resident on an AI device housing 108 and a third party AI server and/or voice recognition engine 150 may not be needed and/or utilized.

In embodiments, solar cells, solar panels and/or solar arrays 104 may be mounted on and/or integrated into a lighting frame and/or lighting fabric 103. In embodiments, solar cells, solar panels and/or solar arrays 104 may generate solar energy from a sun and convert the solar energy into electrical energy (e.g., voltage and/or current). In embodiments, electrical energy generated by one or more solar cells, solar panels and/or solar cell arrays 104 may charge and/or provide power to a rechargeable power source (e.g., a rechargeable battery) in an AI device housing 108 (although a rechargeable battery may be positioned within or located within a lighting support assembly or lighting stem 105 and/or lighting frame assembly or lighting fabric 103). In embodiments, a rechargeable power source 134 in an AI device housing 108 may provide power to components (e.g., memories 128, transceivers 130 131 132, processors 127, and/or microphones 129, etc.) and/or assemblies in an AI device housing 108, a lighting support assembly or lighting support stem 105 and/or lighting frame and/or lighting fabric 103. In embodiments, some components/assemblies in an AI device housing 108 may have a power supply (e.g., a battery) which is either used as a primary or a backup power source for those components and/or assemblies. In embodiments, an AI device housing 108 may also receive power from an AC power source.

In embodiments, an AI device housing 108 may comprise one or more sensors. In embodiments, an AI device housing 108 may comprise one or more environmental sensors 121, one or more directional sensors 122 and/or one or more proximity sensors 123. Although the one or more environmental sensors 121, one or more directional sensors 122 and/or one or more proximity sensors 123 may be illustrated as being located on and/or within the AI device housing 108, the sensors identified above may be located on and/or integrated with a lighting support assembly or lighting support stem 105 and/or a lighting frame assembly and/or lighting fabric 103. In environments, one or more environmental sensors 121 may comprise one or more air quality sensors, one or more UV radiation sensors, one or more digital and/or analog barometers, one or more temperature sensors, one or more humidity sensors, one or more light sensors, and/or one more wind speed sensors. In embodiments, one or more directional sensors 122 may comprise a digital compass, a compass, a GPS receiver, a gyroscope and/or an accelerometer.

In embodiments, an environmental sensor 121 may comprise an air quality sensor. In embodiments, an air quality sensor may provide ozone measurements, particulate matter measurements, carbon monoxide measurements, sulfur dioxide measurements and/or nitrous oxide measurements. In embodiments, an air quality sensor may provide allergen measurements. Ozone leads to intelligent readings to tell an individual whether or not to go inside. In embodiments, an air quality sensor may communicate measurements and/or readings from an air quality sensor and may communicate these measurements to an AI Device housing processor 127. In embodiments, a processor 127, executing computer readable instructions 140 stored in memory 128, may receive air quality sensor measurements, analyze the measurements, store the measurements and/or cause AI device and lighting system assemblies and/or components to react to air quality measurements. In embodiments, for example, if an air quality is too low, e.g., as compared to an existing threshold, one or more processors 127 may communicate commands, instructions and/or signals to an audio system 153 to alert a user of unsafe conditions by reproducing an audible sound on a speaker 152. In embodiments, for example, ozone measurements from an air quality sensor may be utilized to determine an amount of time an individual should be outside, and this amount of time may be communicated to an individual via a sound system (communicated audibly), via a display and/or monitor (displayed visually), and/or wirelessly to an external computing device (e.g., computing device 150).

In embodiments, an AI device housing 108 may comprise an ultraviolet (UV) radiation sensor. In embodiments, a UV radiation sensor may provide discrete radiation band measurements, including, but not limited to UVB, radiation, UVA radiation, Infrared lighting, or a combination of any and all of these radiation measurements. In embodiments, a UV radiation sensor may communicate these measurements to a processor 127. In embodiments, a processor 127 and computer-readable instructions 140 executed by the processor 127, may analyze received UV radiation measurements. In embodiments, a processor 127 and computer-readable instructions 140 executed by the processor 127 may utilize UV radiation measurements received to determine and/or calculate an amount of time an individual should be outside, and this amount of time may be communicated to an individual via a sound system 153 and/or 152 (communicated audibly), via a display and/or monitor, and/or wirelessly to an external computing device 110 or 150.

In embodiments, an environmental sensor 121 in an AI device housing may comprise a digital barometer. In embodiments, a digital barometer may provide, measure, and/or display complex atmospheric data more accurately and quickly than prior barometers. Many digital barometers display both current barometric readings and previous 1-, 3-, 6-, and 12-hour readings in a bar chart format, much like a barograph. They also account for other atmospheric readings such as wind and humidity to make accurate weather forecasts. In embodiments, a a digital barometer may capture atmospheric data measurements and communicate these measurements to a processor 127. In embodiments, for example, computer-readable instructions 140 executed by processor 127 may receive digital barometer measurements (e.g., altitude measurements), analyze and/or process these measurements, and determine necessary movements or actions for components and/or assemblies of an AI device and lighting system 100. In embodiments, for example, computer-readable instructions 140 executed by processor 127 may receive digital barometer measurements and generate a weather forecast for an area being served by an AI device and lighting system 100.

In embodiments, an environmental sensor 121 may comprise a temperature sensor. In embodiments, a temperature sensor may generate and provide a temperature reading or measurement for an environment where an AI device and shading system 100 is located. In embodiments, a temperature sensor may communicate these measurements to a processor 127. In embodiments, computer-readable instructions 140 executed by a processor 127 may receive temperature measurements, analyze the temperature measurements, and/or, determine actions that should be provided to components and/or assemblies of an AI device and lighting system. In embodiments, for example, computer-readable instructions executed by a processor may determine and/or calculate an amount of time an individual should be outside or when lighting elements or assemblies 170 may turned on or off, and this amount of time may be communicated to an individual via a sound system 152 or 153 (communicated audibly), via a display and/or monitor, and/or wirelessly to an external computing device 110 or 150.

In embodiments, an environmental sensor may comprise a humidity sensor. In embodiments, a humidity sensor may capture and generate humidity measurements in an environment where an AI device and shading system 100 is located. In embodiments, a humidity sensor may communicate these measurements to a processor 127. In embodiments, computer-readable instructions 140 executed by a processor may receive humidity measurements, analyze humidity measurements and determine actions that may be taken by components and/or assemblies of an AI device and lighting system 100. In embodiments, for example, computer-readable instructions 140 executed by a processor 127 may be utilized to determine and/or calculate an amount of time an individual should be outside or whether lighting assemblies may be activated and/or deactivated, and this amount of time may be communicated to an individual via a sound system (communicated audibly), via a display and/or monitor, and/or wirelessly to an external computing device. In embodiments, computer-readable instructions 140 executable by a processor may receive humidity sensor readings and/or temperature sensor readings and determine that 1) an AI Device housing should be turned off because the environment is too hot or humid or 2) a lighting support frame or lighting fabric 103 should be deployed to provide cover to the AI device housing. In embodiments, computer-readable instructions 140 executable by a processor 127 may generate commands, instructions and/or signals and communicate the same to a control system (e.g., a motor controller, a motor and/or driving system) to deploy a lighting frame assembly and/or lighting fabric 103.

In embodiments, an environmental sensor 121 may comprise a wind sensor. In embodiments, a wind speed sensor may capture wind speed and/or wind direction, generate wind speed and/or wind direction measurements at an AI device and shading system. In embodiments, a wind sensor may communicate these measurements to a processor 127. In embodiments, computer-readable instructions 140 executable by a processor 127 may receive wind speed measurements, analyze and/or process these measurements, and determine necessary actions and/or movements by components and/or assemblies of an AI device and lighting system 100. In embodiments, computer-readable instructions 140 executable by a processor 127 may communicate commands, signals, and/or instructions to a control system (e.g., a motor controller, a motor and/or driving system) to retract a lighting frame assembly and/or lighting fabric 103 and/or to retract or move a lighting support assembly and/or lighting stem 105 due to high wind conditions. In embodiments, for example, if a wind speed is higher than a predetermined threshold, computer-readable instructions 140 executable by a processor 127 may communicate commands, instructions, and/or signals to one or more motor controllers to cause a lighting frame assembly and/or lighting fabric 103 and/or to retract or move a lighting support assembly and/or lighting stem 105 to be retracted and moved to a rest and/or storage position.

In embodiments, an AI device and housing 100 may comprise one or more digital cameras or imaging devices and/or analog imaging devices 126. In embodiments, one or more cameras 126 may comprise an optical system and/or an image generation system. In embodiments, one or more imaging devices 126 may display images and/or videos on a screen immediately after being captured. In embodiments, one or more imaging devices 126 may store and/or delete images, sound and/or video from a memory associated with an imaging device 126. In embodiments, one or more imaging devices 126 may capture, record and/or moving videos with or without sound. In embodiments, one or more imaging devices 126 may also incorporate computer-readable and computer-executable instructions which, which when retrieved from a non-volatile memory, loaded into a memory, and executed by a processor, may crop and/or stitch pictures, and/or potentially perform other image editing on captured images and/or video. For example, image stitching or photo stitching is the process of combining multiple photographic images with overlapping fields of view to produce a segmented panorama and/or high-resolution image. In embodiments, image stitching may be performed through the use of computer software embodied within an imaging device 126. In embodiments, an imaging device 126 may also internally perform video stitching. In embodiments, other devices, components and/or assemblies of imaging devices 126 or of an AI device housing 108 may perform image stitching, video stitching, cropping and/or other photo editing. In embodiments, computer-readable instructions 140, may be executable by a processor 127 in an AI device housing 108 may perform image stitching, video stitching, cropping and/or other photo editing.

In embodiments, imaging devices 126 (e.g., digital cameras) may capture images of an area around, surrounding, and/or adjacent to AI devices with a lighting system 100. In embodiments, an AI device housing 108 may comprise one or more imaging devices 126 (e.g., cameras) mounted thereon or integrated therein. In embodiments, a lighting support assembly or lighting support stem 105 and/or a lighting frame assembly and/or lighting fabric 103 may comprise one or more imaging devices 126 (e.g., cameras). In embodiments, an AI device and lighting system with more than one imaging device 126 may allow image, video and/or sound capture for up to 360 degrees of an area surrounding, around and/or adjacent to an AI device and lighting system 100. In embodiments, computer-readable instructions 140 executable by a processor 127 may stitch and/or combine images and/or videos captured by one or more imaging devices 126 to provide a panoramic image of the area. The ability of having multiple imaging devices 126 to allows a benefit of panoramic image capture and not just an area where an imaging device is initially oriented. In embodiments, one or more imaging devices 126 may have one or more image capture resolutions (e.g., 1 Megapixel (MP), 3 MP, 4 MP, 8 MP, 13 MP and/or 38 MP) that are selectable and/or adjustable. In embodiments, one or more imaging devices may also be located on a top portion of a lighting support frame or lighting fabric 103 and/or lighting support assembly and/or lighting stem 105 In embodiments, if an imaging device 126 is located on a top portion of an AI device with shading system 100 (e.g., a lighting frame assembly and/or lighting fabric 103 and/or lighting support assembly or lighting support stem 105), images, sounds and/or videos may be captured at a higher level than ground level. In addition, an imaging device located on a top portion of an AI device and lighting system 1 may capture images, sounds, and/or videos of objects in a sky or just of a horizon or sky. For example, in embodiments, an imaging device 126 located on a top portion may capture images of mountains and/or buildings that are in a skyline. This may be beneficial in situations where there is a fire in the mountain or an issue with a building or someone wants to monitor certain aspects of a building (e.g., if certain lights are on). Further, one or more imaging devices 126 located on a top portion of an AI device with lighting system 100 may capture images, sounds, and/or videos of a night time sky (e.g., stars). In addition, one or more imaging device 126 located on a top portion of an AI device and lighting system 100 may capture images, sounds, and/or videos of objects moving and/or flying in the sky and/or horizon. This is clearly an improvement over traditional cameras which do no capture images of the stars, sky, mountains, geography and/or buildings.

In embodiments, one or more imaging devices 126 may be activated by messages, signals, instructions and commands. In embodiments, components and/or assemblies of an AI device and lighting system 100 (e.g., a processor 127, computer-readable instructions 140 executed by a processor 127, and/or a proximity sensor 123) may communicate messages, signals, instructions and/or commands to the one or more imaging devices 126 to activate, turn on, change modes, turn off, change focus and/or change capture image resolution. In addition, messages, signals, instructions, and/or commands may activate one or more imaging devices 126 and software stored therein may perform image stitching, video stitching, image editing and/or cropping. In embodiments, a processor 127 and/or wireless transceiver 130-132 in an AI device with lighting system 100 may communicate messages, signals, instructions and/or commands to activate one or more imaging devices in order to perform functions and/or features described above (which may include security system functions). In embodiments, a computing device 110 or 150, separate from an AI device with lighting system 100, may communicate messages, signals, instructions and/or commands to activate one or more imaging devices in order to perform functions and/or features described above.

In embodiments, one or more imaging devices 126 may communicate captured images, sounds and/or videos to a processor 127 of an AI shading device and these images, sounds and/or videos may be stored in one or more memories 128 in an AI device housing 108. In embodiments, one or more imaging devices 126 may communicate captured images, sounds and/or videos to a memory of a remote computing device (e.g., computing device 150) separate from a processor and/or controller 127 in an AI device housing 108. In embodiments, for example, one or more imaging devices 126 may communicate captured images, sounds and/or videos to an external computing device (directly for storage and/or streaming). In embodiments, one or more imaging devices 126 may communicate captured images, sounds, and/or videos utilizing wired (e.g., utilizing Ethernet, USB, or similar protocols and transceivers) and/or wireless communication protocols (e.g., utilizing 802.11 wireless communication protocols and transceivers).

In embodiments, an AI device housing 108 may comprise one or more of imaging devices 126 and an infrared detector. In embodiments, an infrared detector may comprise one or infrared light sources and an infrared sensor. In embodiments, an infrared detector may generate a signal indicating that an object is located within an area being monitored or viewed by an infrared detector. In embodiments, if an infrared detector generates a signal indicating that an object (and/or individual) is present, one or more imaging devices 126 may be activated and begin to capture images and/or video, with or without sound, and communicate captured images and/or video, with or without sound, to a separate computing device and/or a processor 127. In embodiments, if an infrared detector generates a signal indicating that an object (and/or individual) is present, a lighting assembly (e.g., LED lights) 170 may also be activated and lights may be directed in an area surrounding an AI device and lighting system 100 and/or directly to an area where an object is detected. In embodiments, one or more imaging devices 126 and/or one or more lighting assemblies 170 may be activated, which results in better images and/or video of an area surrounding an AI device and lighting system 100. This is yet another example of how an AI device and lighting system 100 provides additional benefits of not only capturing images of its surrounding area but also being utilized as a security device for an environment in which an intelligent shading object is located.

In embodiments, an AI device housing 108 may comprise or more imaging devices 126 which may be thermal imaging cameras. In embodiments, thermal imaging cameras may include a special lens, an infrared light, and an array of infrared-detector elements. In embodiments, an AI device and lighting system 100 may comprise an infrared light, a lens and a phased-array of infrared-detector elements. In embodiments, a thermal imaging camera comprises a special lens may focus on infrared light emitted by all objects within an area surrounding and/or adjacent to an AI device and lighting system 100. In embodiments, a focused light may be scanned by a phased array of infrared-detector elements. In embodiments, one or more detector elements may generate a very detailed temperature pattern, which may be referred to as a thermogram. In embodiments, a detector array may take a short amount of time (e.g., about one-thirtieth of a second) to obtain temperature information to make a thermogram. In embodiments, information may be obtained from a plurality of points in a field of view of a detector array. In embodiments, detector elements from a thermogram may be converted and/or translated into electric impulses and electrical impulses may be sent to a signal-processing unit. In embodiments, a signal-processing unit may be a PCB with a dedicated chip that translates received information (electrical impulses) into thermal images and/or thermal video. In embodiments, a signal-processing unit may communicate thermal images and/or thermal video either to a display (e.g., a display and/or a display on a computing device communicating with an AI device and lighting system 100). In embodiments, a signal-processing unit of a thermal imaging camera may communicate thermal images and/or thermal video to a processor for analysis, storage and/or retransmission to an external computing devices. In embodiments, a thermal image may appear as various colors depending on and/or corresponding to an intensity of an infrared image. In embodiments, a thermal imaging camera allows additional benefits of not having to activate a lighting assembly in order to capture images and/or videos of an area surrounding an AI device and lighting system 100. In addition, by not activating a lighting assembly, an intruder or moving object may not be aware that an imaging device 126 may be capturing an image or video of an area where an intruder or object is located. In embodiments, an infrared detector may activate a thermal imaging device upon detection of movement. In embodiments, a thermal imaging device may activate on its own due to movement of an intruder and/or object, or may be periodically or continuing capturing images and/or video.

In embodiments, an AI device and lighting system 100 may comprise a proximity sensor 123. In embodiments, a proximity sensor 123 may be able to detect a presence of nearby objects, (e.g., people or other physical objects) without any physical contact between a sensor and an object. In embodiments, a proximity sensor 123 be located on and/or mounted on an AI device housing 108. In embodiments, a proximity sensor 123 may be located on and/or mounted on other printed circuit boards or may be a stand-alone component. In embodiments, a proximity sensor 123 may be located within and/or mounted on a lighting support assembly or lighting support stem 105 and/or a lighting frame assembly and/or lighting fabric 103. In embodiments, a proximity sensor 123 may generate measurements and/or signals, which may be communicated to a processor/controller 127. In embodiments, computer-readable instructions 140, which are fetched from memory 128 and executed by a processor 127, may perform and/or execute a proximity process or method. In embodiments, for example, a proximity process may comprise receiving measurements and/or signals from a proximity sensor 123 indicating an object and/or person may be located in an area where an AI device and lighting system is deployed, going to be deployed and/or extended, and/or towards where a component of an AI device and lighting system 100 may be moving. For example, if an individual is located in an area where a lighting support assembly or lighting support stem 105 may be deployed and/or extended, a proximity sensor 123 may transmit a signal or measurement indicating an object may be an obstruction to movement of a lighting support assembly or lighting support stem 105. In embodiments, computer-readable instructions 140 executable by a processor 127 may receive and/or analyze a proximity measurement and determine an object may be an obstacle. In embodiments, a proximity signal and/or command may also identify a location of an object (e.g., obstacle) in relation to a proximity sensor 123 and/or some reference location. In embodiments, computer-readable instructions 140 executable by a processor 127 may generate and/or communicate a driving signal, command, and/or instruction that instructs an AI device and lighting system 100 not to deploy and/or open. In embodiments, this may also work in the opposite direction, where if a proximity sensor 123 does not determine that an object is within an AI device and lighting system's area, then a proximity sensor signal may not be communicated to the processor/controller 127.

In embodiments, a proximity sensor may identify location of a person relative to moving components of an AI device and lighting system 100. Utilization of proximity sensors 127 on AI devices and lighting system provides an advantage over AI devices due to detection of objects, individuals, animals and/or other devices. For example, based on proximity sensor measurements, detections and/or values, an AI device and lighting system 100 may move a position of one or more assemblies or modules (e.g., shading support, shading element, and/or other components) to prevent problematic conditions or situations where objects and/or individuals may damage components and/or assemblies of an AI device and lighting system 100. For example, based on proximity sensor 123 measurements or values, a lighting frame assembly and/or lighting fabric 103 and/or to retract or move a lighting support assembly and/or lighting stem 105 may be retracted.

In embodiments, proximity sensors 123 may comprise one or more laser sensors, light sensors, line of sight sensors, ultrasound or ultrasonic sensors, infrared or other light spectrum sensors, radiofrequency sensors, time of flight sensors, and/or capacitive sensors. In embodiments, a proximity sensor 123 may emit an electromagnetic field or a beam of electromagnetic radiation (infrared, for instance), and may measure changes in a field surrounding an object or measure changes in a return signal. In embodiments, a laser sensor may comprise through-beam sensors, retro-reflective sensors and/or diffuse reflection sensors. In embodiments, a laser light returned may be measured against an original signal to determine if an object and/or person is present. In embodiments, laser light may consist of light waves of the same wave length with a fixed phase ratio (coherence), which results in laser systems having almost parallel light beam. Thus, movements may be detected via small angles of divergence in returned laser light. In embodiments, a light or photoelectric sensor may be utilized as a proximity sensor 123 and may transmit one or more light beams and may detect if any return reflected light signals are present. In embodiments, a photoelectric sensor may be a diffusion and/or retro-reflective and/or diffusion sensor. In embodiments, diffusion sensor emitters and receivers may be located in a same housing. In embodiments, a target may act as a reflector, so that detection may occur if light is reflected off a disturbance object. In embodiments, an emitter sends out a beam of light (most often a pulsed infrared, visible red, or laser) that diffuses in all directions, filling a detection area. In embodiments, a target may enter an area and may deflects part of a beam back to a receiver. In embodiments, a photoelectric sensor may detect a target and an output signal may be turned on or off (depending upon whether a photoelectric sensor is light-on or dark-on) when sufficient light falls on a receiver of a photoelectric sensor.

In embodiments, a proximity sensor 123 may be an inductive sensor which may detect movements in metallic and/or ferrous objects. In embodiments, inductive sensors may detect ferrous targets, for example, a metal (e.g., steel) thicker than one millimeter. In embodiments, a proximity sensor 123 may be a capacitive sensor. In embodiments, a capacitive sensor may detect both metallic and/or non-metallic targets in powder, granulate, liquid, and solid form. In embodiments, a proximity sensor 123 may be an ultrasonic sensor. In embodiments, an ultrasonic diffuse proximity sensor may employ a sonic transducer, which emits a series of sonic pulses, then listens for their return from a reflecting target. In embodiments, once a reflected signal is received, sensor signals may be output to a control device. In embodiments, an ultrasonic sensor may emit a series of sonic pulses that bounce off fixed, opposing reflectors, which may be any flat surface. In embodiments, sound waves may return to a sensor within a user-adjusted time interval and if sound waves do not, an object may be obstructing an ultrasonic sensing path and an ultrasonic sensor may output signals accordingly. In embodiments, a proximity sensor 123 may be a time of flight sensor. In embodiments, time of flight optical sensors may determine displacement and distance by measuring a time it takes a light to travel from an object (intelligent shading system) to a target and back. In embodiments, a time of flight sensor may be a time of flight camera, which is a range imaging camera. In embodiments, a time-of-flight camera (ToF camera) may resolves distance based on speed of light, by measuring a time-of-flight of a light signal between a camera and a subject and/or target for each point of an image.

In embodiments, an AI device housing 108 may comprise one or more directional sensors 122. In embodiments, a directional sensor 122 may also comprise a GPS transceiver, a compass, a magnetometer, a gyroscope and an accelerometer. In embodiments, a lighting support assembly or lighting support stem 105 and/or a lighting frame assembly and/or lighting fabric 103 may comprise one or more directional sensors (e.g., GPS transceiver, a compass, a gyroscope and an accelerometer). In embodiments, directional sensors may provide orientations and/or locations of an AI device and lighting system 100 as well as different components of an AI device and lighting system 100. In embodiments, computer-readable instructions 140 executable by a processor 127 may request an initial desired orientation for different assemblies and/or components of an AI device and lighting system and communicate such directional request to one or more directional sensors 122. In embodiments, one or more gyroscopes may be utilized to determine, calculate and/or detect an angle of a lighting support assembly or lighting support stem 105 with respect to an AI device housing 108 and/or detect an angle of a lighting support assembly or lighting support stem 105 with respect to a lighting frame and/or lighting fabric 103 (e.g., determine a current elevation of different assemblies of an AI device and lighting system 100). In embodiments, one or more accelerometers may also be utilized along with one or more gyroscopes to determine, calculate and/or detect angles discussed above.

In embodiments, computer-readable instructions 140 executed by a processor 127 may communicate a directional request to one or more directional sensors 122. In embodiments, one or more directional sensors 122 (e.g., compass and/or magnetometer) may determine movement and/or a relative position of an AI device with lighting system 100 (or other components or assemblies) with respect from a reference direction. In embodiments, for example, a directional measuring sensor 122 (e.g., compass, digital compass and/or magnetometer) may determine relative movement and/or a relative position with respect to true north. In embodiments, for example, a compass and/or a digital compass may determine movement and/or a relative position with respect to true north. In embodiments, these measurements may be referred to as heading measurements. In embodiments, a directional measuring sensor 122 may communicate and/or transfer heading measurements to one or more processors 127, where these heading measurements may be stored in one or more memories 128.

In embodiments, in response to a directional orientation request by computer-readable instructions 140 executed by a processor 127, a GPS transceiver may measure a geographic location of an AI device and lighting system 100 (and associated assemblies) and may communicate such geographic location measurement to one or more processors 127, which may transfer these heading measurements into one or more memories 128. In embodiments, a GPS transceiver may determine latitude and/or longitude coordinates and communicate such latitude and/or longitude coordinates to one or more memories 127. In embodiments, a clock may capture a time of day and communicate and/or transfer such time measurement to one or more processors, which may store the time measurement in one or more memories 128.

In embodiments, computer-readable instructions 140 executed by a processor 127 stored in a memory 128 may include algorithms and/or processes for determining and/or calculating a desired azimuth and/or orientation and/or elevation of an AI device and lighting system 100 (and associated assemblies) depending on a time of day. In an alternative embodiment, a portable computing device executing computer-readable instructions on a processor (e.g., a SMARTSHADE software app) and located in a vicinity of an AI device and lighting system 100 may retrieve coordinates utilizing a mobile computing device's GPS transceiver and may retrieve a time from a mobile computing device's processor clock and provide these geographic location measurements and/or time to a processor 127 in an AI lighting device housing 108.

In embodiments, computer-readable instructions 140 stored in a memory 128 may be executed by processor 127 and may calculate a desired AI device and lighting system 100 (and associated assemblies such as lighting support assembly or lighting support stem 105 and/or lighting frame assembly and/or lighting fabric 103) angle and/or azimuth angle utilizing received geographic location measurements, heading measurements, and/or time measurements. In embodiments, computer-readable instructions 140 stored in one or more memories 128 may compare a plurality of desired elevation angle measurements and azimuth angle measurements to a current elevation angle and azimuth angle of the AI device and lighting system 100 (and associated assemblies such as lighting support assembly or lighting support stem 105 and/or lighting frame assembly and/or lighting fabric 103) (calculated from gyroscope measurements, accelerometer measurements, and/or both) to determine movements that a lighting support assembly or lighting support stem 105 and/or lighting frame assembly and/or lighting fabric 103 may make in order to move to a desired orientation. In embodiments, executed computer-readable instructions may calculate an azimuth adjustment measurement to provide to an azimuth motor and/or an elevation adjustment measurement to provide to a motor assembly.

In embodiments, an AI device housing 108 may comprise one or more microphones 129 to capture audio, and/or audible or voice commands spoken by users and/or operators of lighting systems 100. In embodiments, computer-readable instructions 140 executed by one or more processors 127 may receive captured sounds and create analog and/or digital audio files corresponding to spoken audio commands (e.g., open shading system, rotate shading system, elevate shading system, select music to play on shading system, turn on lighting assemblies). In embodiments, an AI API 141 may communicate such generated audio files to an external AI server 150. In embodiments, for example, an AI API 141 in an AI lighting device housing 108 may communicate generated audio files to external AI servers 150 via and/or utilizing one or more PAN transceivers 130, one or more wireless local read network transceivers 131, and/or one or more cellular transceivers 132. In other words, communications with an external AI server 150 may occur utilizing PAN transceivers 130 (and protocols). Alternatively, or in combination with, communications with an external AI server 150 may occur utilizing a local area network (802.11 or WiFi) transceiver 131. Alternatively, or in combination with, communications with an external AI server 150 may occur utilizing a cellular transceiver 132 (e.g., utilizing 3G and/or 4G or other cellular communication protocols). In embodiments, an AI lighting device housing 108 may utilize or comprise more than one microphone 129 to allow capture of voice commands from a number of locations and/or orientations with respect to an AI device and lighting system 100 (e.g., in front of, behind an AI device and lighting system 100, and/or at a 45 degree angle with respect to a lighting support assembly or lighting support stem 105).

In embodiments, a mobile computing device 110 may communicate with an AI Device and lighting system 100. In embodiments, a user and/or operator may communicate with a mobile computing or communications device 110 by a spoken command into a microphone of a mobile computing device 110. In embodiments, a mobile computing or communications device 110 may communicate a digital or analog audio file to a processor 127 and/or AI API 141 in an AI lighting device housing 108 (e.g., utilizing one or more of transceivers (e.g., PAN transceiver 130; wireless or WiFi transceiver 131 and/or cellular transceiver 132). In embodiments, a mobile computing or communications device 110 may also convert the audio file into a textual file for easier conversion by either an AI API 141 or an AI engine in a an external AI server or computing device 150. In embodiments, an AI engine may also be resident within one or more memories 128 of an AI lighting device housing 108 (e.g., computer-readable instructions 140 executed by one or more processors 127)

In embodiments, an AI shading device housing 108 such as the one described above may be attached to any lighting system and may provide artificial intelligence functionality and services for such shading systems. In embodiments, an AI device lighting system 100 may be an autonomous and/or automated lighting system having an integrated computing device, sensors and other components and/or assemblies, but may benefit from having and may have artificial intelligence functionality and services provided utilizing an AI API and/or an AI engine stored in a memory of an AI lighting device housing 108.

In embodiments, an AI device lighting housing 108 may comprise an audio transceiver 153 and/or a sound reproduction device 152 (e.g., speaker). In embodiments, audio files (e.g., digital and/or analog digital files) may be communicated to an audio transceiver 153 and further to a sound reproduction device 152 for audible reproduction. Thus, communications from an AI engine (e.g., feedback commands and/or instructions) may be communicated to a transceiver 153 and/or speaker for audible feedback. In embodiments, music and/or audio files communicated from an external server and/or from local memory may be communicated to an audio transceiver 153 and/or speaker 152 for audible reproduction to a user and/or operator.

Figure 5:
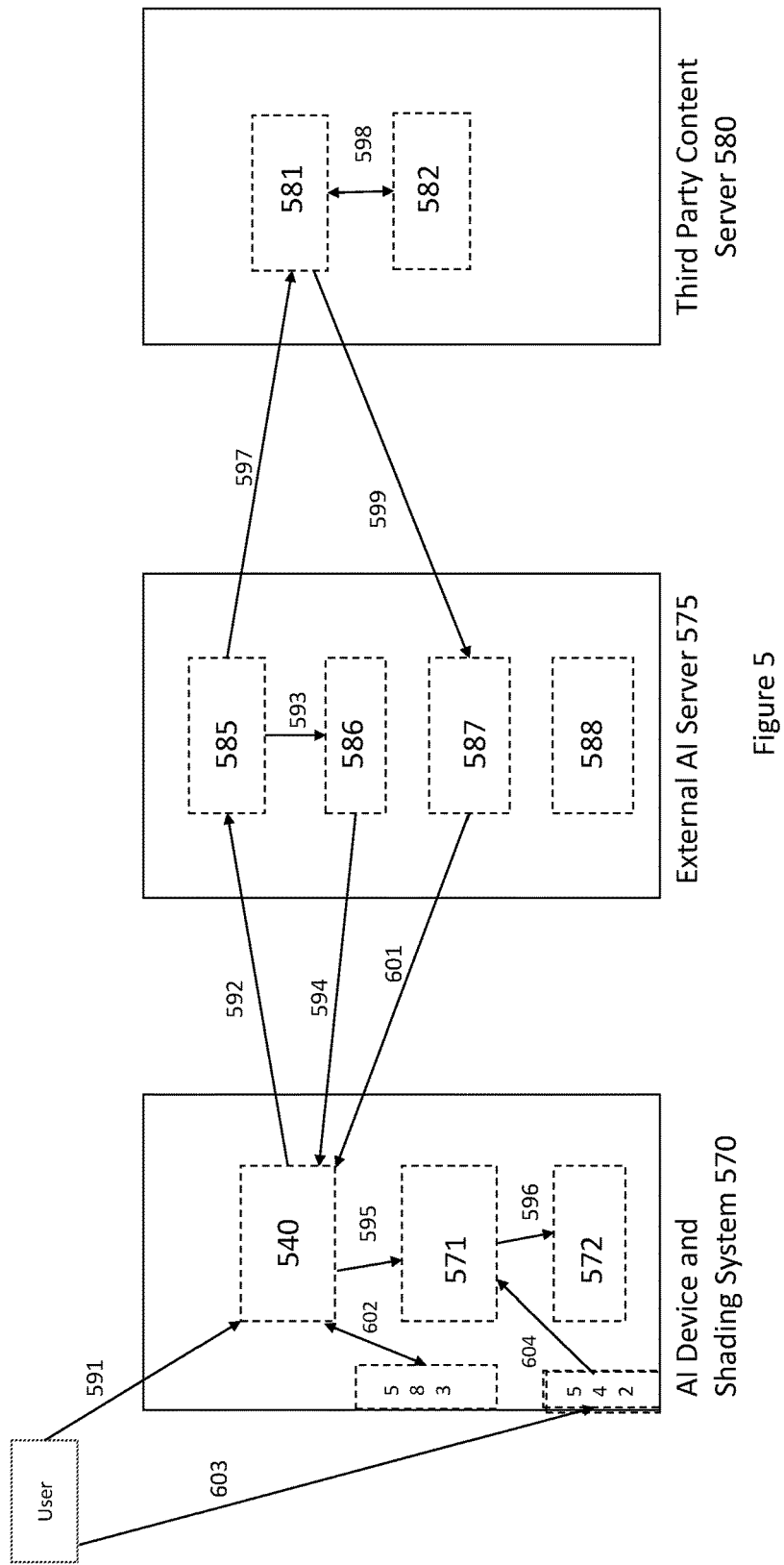
FIG. 5 illustrates a block and dataflow diagram of communications between an AI device and lighting system according to embodiments

In embodiments, an AI device and lighting system 100 may comprise one or more lighting elements and/or assemblies 170. In embodiments, one or more lighting elements and/or assemblies 170 may reside and/or integrated into a lighting frame assembly or lighting fabric 103. In embodiments, one or more lighting elements and/or assemblies 170 may be integrated into and/or resident on a lighting support assembly 105 and/or an AI device housing 108. In embodiments, one or more lighting elements and/or assemblies 170 may provide illumination and/or light into dark environments and/or low light environments. In embodiments, one or more lighting elements and/or assemblies may be FIG. 5 illustrates a block and dataflow diagram of communications between an AI device and lighting system according to embodiments. An AI Device and lighting system 500 may communicate with an external AI server 575 and/or additional content servers 580 via wireless and/or wired communications networks. In embodiments, a user may speak 591 a command (e.g., turn on lights and/or turn on music) which is captured as an audio file and received at an AI device and lighting system 570. In embodiments, an AI API 540 in an AI device and lighting system 570 may communicate and/or transfer 592 an audio file (utilizing a transceiver—PAN, WiFi/802.11, or cellular) to an external or third-party AI server 575. In embodiments, an external AI server 575 may comprise a voice recognition engine or module 585, a command engine module 586, a third party content interface 587 and/or third party content formatter 588. In embodiments, an external AI server 575 may receive 592 one or more audio files and a voice recognition engine or module 585 may convert received audio file to a device command (e.g., shading system commands, computing device commands) and communicate 593 device commands to a command engine module or engine 586. In embodiments, if a voice command is for operation of an AI device and lighting system 570, a command engine or module 586 may communicate and/or transfer 594 a generated command, message, and/or instruction to an AI device and lighting system 570. In embodiments, an AI device and lighting system 570 may receive the communicated command, communicate and/or transfer 595 the communicated command to a controller/processor 571. In embodiments, the controller/processor 571 may generate 596 a command, message, signal and/or instruction to cause an assembly, component, system or devices 572 to perform an action requested in the original voice command (e.g., activate or deactivate lighting assemblies, turn on camera and/or sensors, activate solar panels).

In embodiments, a user may request actions to be performed utilizing a AI device and lighting system's microphones and/or transceivers that may require interfacing with third party content servers (e.g., NEST, e-commerce site selling sun care products, e-commerce site selling parts of AI devices and shading systems, communicating with online digital music stores (e.g., iTunes), home security servers, weather servers and/or traffic servers). For example, in embodiments, an AI device and lighting system user may request 1) traffic conditions from a third party traffic server; 2) playing of a playlist from a user's digital music store accounts; and/or 3) ordering a replacement bulbs and/or light holders for a lighting system. In these embodiments, additional elements and steps may be added to previously described method and/or process.

For example, in embodiments, a user may speak 591 a command or desired action (execute playlist, order replacement lighting assemblies and/or lighting components, and/or obtain traffic conditions from a traffic server) which is captured as an audio file and received at an AI API 540 stored in one or more memories of an AI device housing 570. As discussed above, in embodiments, an AI API 540 may communicate and/or transfer 592 an audio file utilizing an AI device and lighting system's transceiver to an external AI server 575. In embodiments, an external AI server 575 may receive one or more audio files and a voice recognition engine or module 585 may convert 593 received audio file to a query request (e.g., traffic condition request, e-commerce order, retrieve and stream digital music playlist).

In embodiments, an external AI server 575 may communicate and/or transfer 597 a query request to a third party server (e.g., traffic conditions server (e.g., SIGALERT or Maze), an e-commerce server (e.g., a RITE-AID or SHADECRAFT SERVER, or Apple iTunes SERVER) to obtain third party goods and/or services. In embodiments, a third party content server 580 (a communication and query engine or module 581) may retrieve 598 services from a database 582. In embodiments, a third party content server 580 may communicate services queried by the user (e.g., traffic conditions or digital music files to be streamed) 599 to an external AI server 575. In embodiments, a third party content server 580 may order requested goods for a user and then retrieve and communicate 599 a transaction status to an external AI server 575. In embodiments, a content communication module 587 may receive communicated services (e.g., traffic conditions or streamed digital music files) or transaction status updates (e.g., e-commerce receipts) and may communicate 601 the requested services (e.g., traffic conditions or streamed digital music files) or the transaction status updates to an AI device and shading system 570. Traffic services may be converted to an audio signal, and an audio signal may be reproduced utilizing an audio system 583. Digital music files may be communicated and/or streamed directed to an audio system 583 because there is no conversion necessary. E-commerce receipts may be converted and communicated to speaker 583 for reading aloud. E-commerce receipts may also be transferred to computing device in an AI device and lighting system 570 for storage and utilization later.

In embodiments, computer-readable instructions in a memory module of a an AI device and lighting system 570 may be executed by a processor and may comprise a voice recognition module or engine 542 and in this embodiment, voice recognition may be performed at an AI device and lighting system 570 without utilizing a cloud-based server. In embodiments, an AI device and lighting system 570 may receive 603 the communicated command, communicate and/or transfer 604 the communicated command to a controller/processor 571. In embodiments, the controller/processor 571 may generate and/or communicate 596 a command, message, signal and/or instruction to cause an assembly, component, system or device 572 to perform an action requested in the original voice command.

Figure 2:
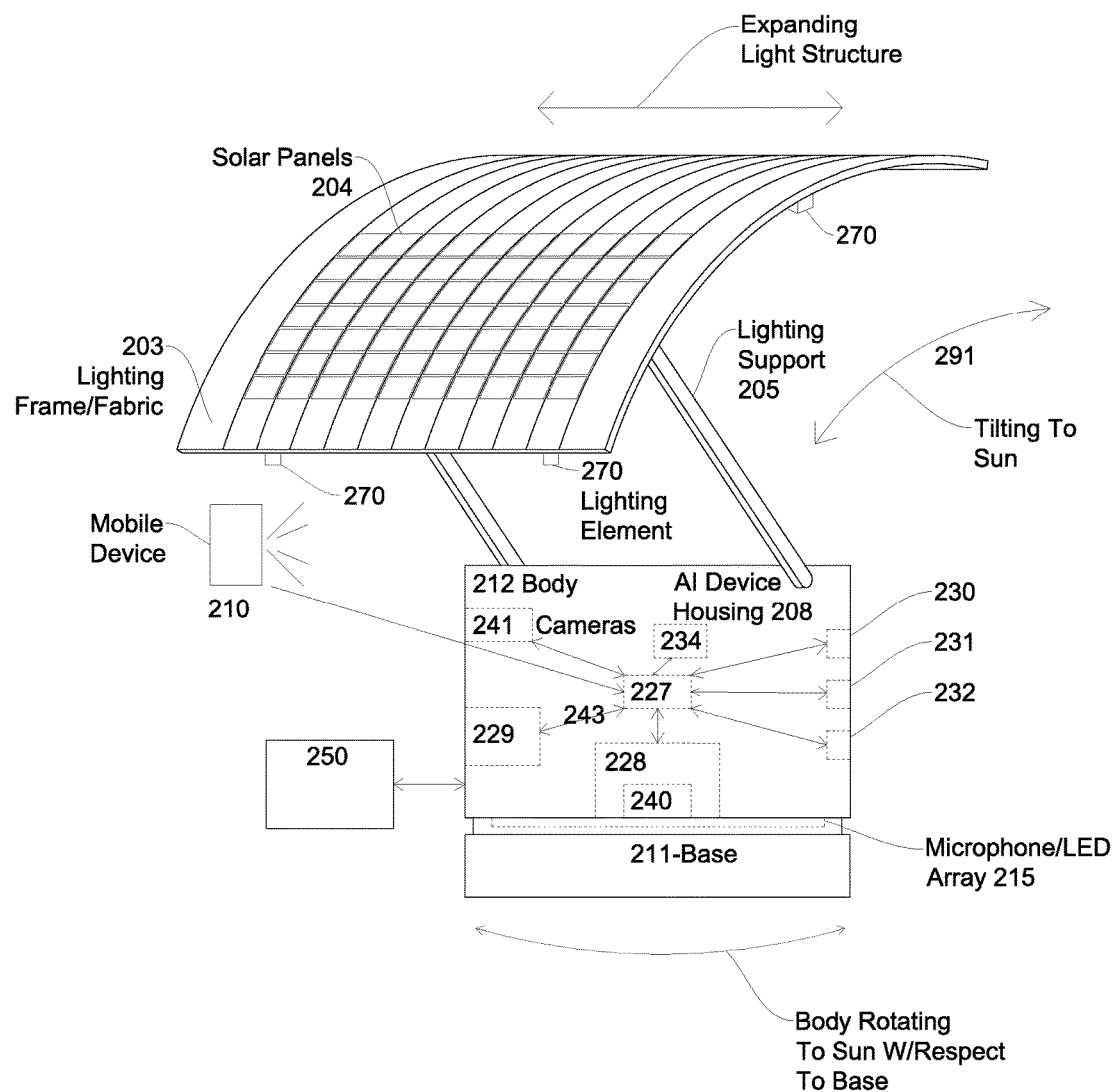
FIG. 2 illustrates an AI device and lighting system with an adjustable lighting support and/or adjustable lighting stem assembly according to embodiments.

FIG. 2 illustrates an AI device and lighting system with an adjustable lighting support and/or adjustable lighting stem assembly according to embodiments. In embodiments, an AI and lighting system 200 comprises a lighting frame support, lighting support fabric or lighting support cover (or a plurality of lighting frame supports, lighting frame assemblies, lighting fabric or lighting support covers) 203, one or more lighting supports, lighting support assemblies and/or lighting stems 205 and/or an AI device housing 208. In embodiments, an AI device housing 208 may comprise an upper body 212 and a base assembly 211. In embodiments, an AI device housing 208 may comprise a microphone and/or LED array 215. In embodiments, an AI device housing 208 may comprise one or more processors 227, one or more PAN transceivers 230, one or more WiFi or 802.11 transceivers 231, and/or one or more cellular transceivers 232 (the operations of which are described above with respect to FIG. 1). In addition, an AI device housing 208 (and/or an AI device and lighting system 200) may also include sensors (similar to directional sensors 122, environmental sensors 121 and/or proximity sensors 123 of FIG. 1, which are not shown but may operate in a similar fashion as described in FIG. 1), and/or one or more audio receivers and/or one or more speakers (which are shown in FIG. 1 and the operation of which is described above). In embodiments, an AI device housing may comprise a computing device although this is not shown or described in FIG. 2.

In embodiments, an AI device housing or lighting housing 208 may comprise one or more audio transceivers 243 and/or one or more speakers 229. In embodiments, audio files, music files, and/or voice files may be communicated to one or more audio transceivers 243 and/or one or more speakers 229 for audio playback. In embodiments, one or more speakers 229 may be a speaker line array where speakers are located at least on each side of an AI device housing 208 to provide sound coverage on each side of an AI device housing 208.

Figure 4:
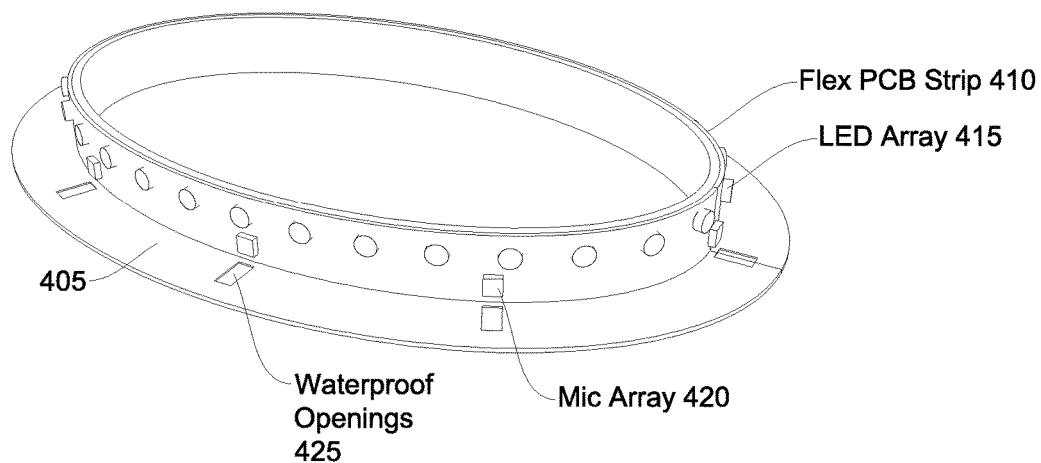
FIG. 4 illustrates a microphone and/or LED array in an AI device housing according to embodiments.

In embodiments, a microphone and/or LED lighting array 215 may provide sound capture and/or lighting on each side or a number of sides of an AI device housing 208. In embodiments, as is illustrated in FIG. 2, a microphone and/or LED array 215 may be positioned above a base assembly 211 of an AI device housing 208. FIG. 4 illustrates a microphone and/or LED array 215 in an AI device housing 208 according to embodiments. In embodiments, a microphone and/or LED array 400 may comprise a plastic, metal, wood and/or composite housing 405, one or more flexible printed circuit boards (PCBs) or circuit assemblies 410, one or more LEDs or LED arrays 415 and/or one or more microphones and/or microphone arrays 420. In embodiments, a plastic, metal, wood and/or composite housing 405 may be oval or circular in shape. In embodiments, a plastic, metal, wood and/or composite housing 405 may be fitted around a shaft, a post and/or tube in an AI device housing 208. In embodiments, a plastic, metal, wood and/or composite housing 405 may be adhered to, connected to and/or fastened to a shaft, a post and/or tube. In embodiments, a flexible PCB or housing 410 may be utilized to mount and/or connect electrical components and/or assemblies such as LEDs 415 and/or microphones 420. In embodiments, a flexible PCB or housing 410 may be mounted, adhered or connected to a plastic, metal, wood and/or composite housing or ring 405. In embodiments, a flexible PCB or housing 410 may be mounted, adhered or connected to an outer surface of a plastic housing or ring 405. In embodiments, a plastic, metal, wood and/or composite housing or ring 405 may have one or more waterproof openings 425 for venting heat from one or more microphone arrays 420 and/or one or more LED arrays 415. In embodiments, a plastic housing or ring 405 may have one or more waterproof openings for keeping water away and/or protecting one or more microphone arrays 420 and/or one or more LED arrays 415 from moisture and/or water. In embodiments, one or LED arrays 415 may be mounted and/or connected on an outer surface of a flexible PCB strip 410 and may be positioned at various locations on the flexible PCB 410 to provide lighting in areas surrounding a lighting and AI system 200. In embodiments, one or more LED arrays may be spaced at uniform distances around a plastic, metal, wood and/or composite housing 405 (e.g., or ring housing). In embodiments, one or more microphones or microphone arrays 420 may be mounted and/or connected to a flexible PCB strip 410. In embodiments, one or more microphones or microphone arrays 420 may be positioned at one or more locations around a plastic, metal, wood and/or composite housing or ring 405 to be able capture audible sound and/or voice commands coming from a variety of directions. In embodiments, one or more microphones or microphone arrays 420 may be spaced at set and/or uniform distances around a plastic, metal, wood and/or composite housing and/or ring 405.

Figure 6:
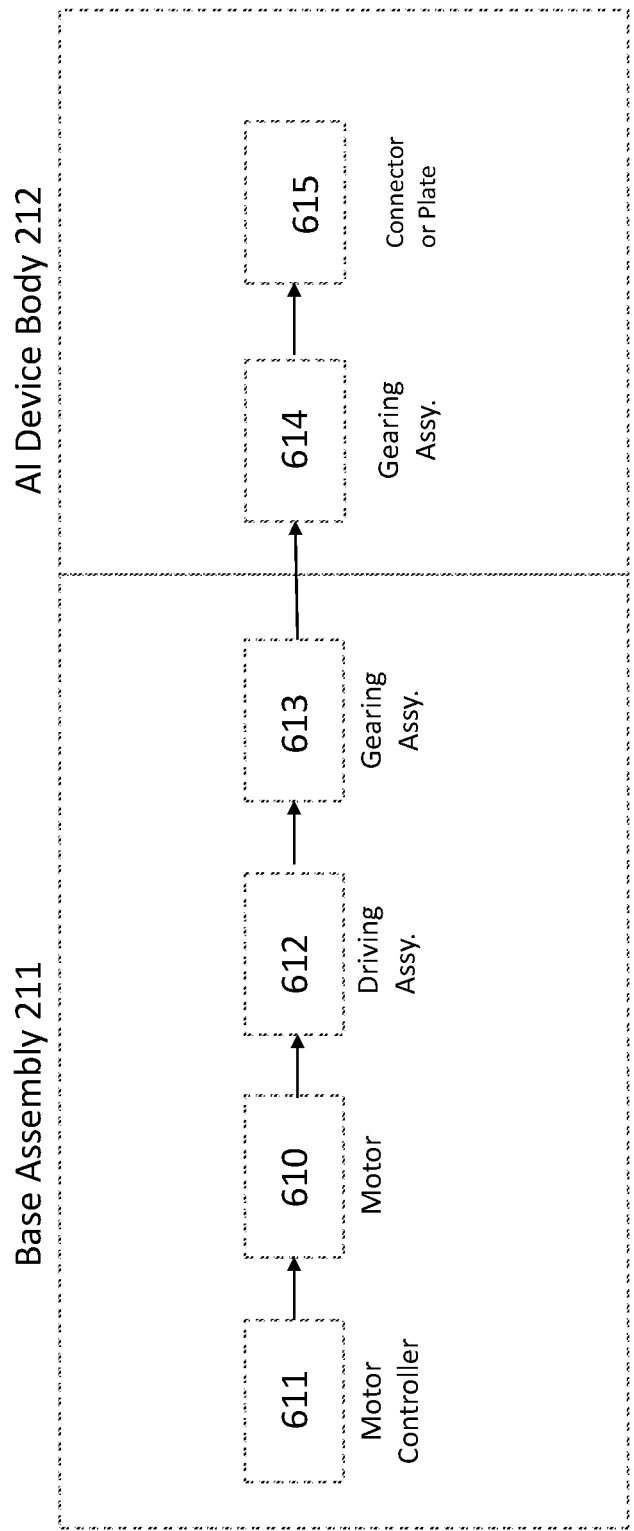
FIG. 6 illustrates a block diagram of components and assemblies for rotating an AI device housing or upper body about a base assembly.

Referring back to FIG. 2, in embodiments, a base assembly 211 may be stationary. In embodiments, an AI device body or upper body 212 may rotate about a base assembly 211. In embodiments, as illustrated in FIG. 6, a base assembly 211 may comprise a motor 610, a motor controller 611, a shaft or driving assembly 612 and/or a gearing assembly 613. In embodiments, an AI device upper body or 212 may comprise a gearing assembly 614 and/or a connector 615. In embodiments, in response to one or more commands, messages, signals and/or instructions being received by a motor controller 611, a motor controller 611 may communicate commands and/or signals to a motor 610. In response, a motor 610 may be activated and may cause rotation of one or more shafts or driving assemblies 612, which may be connected to one or more gearing assemblies 613. In embodiments, rotation of one or more shafts or driving assemblies 612 may cause rotation of one or more gearing assemblies 613. In embodiments, rotation of one or more gearing assemblies 613 in a base assembly 211 may cause rotation of a one or more gearing assemblies 614 in an AI device upper body 212, which is connected and/or coupled to a connector or plate 615 in an AI device upper body 208. In embodiments, rotation of a gearing assembly 614 and/or a connector or plate 615 may cause rotation of the AI device upper body 212 about a base assembly 211. This provides an advantage over other prior art devices because the AI device housing 208 may move to track an individuals' movement and/or a need to provide lighting in different directions and/or orientations around an AI device housing 208. In embodiments, this may be referred to as azimuth rotation and rotating a whole assembly towards a given heading and/or direction. In addition, if a lighting support frame 203 is made of a fabric, then another advance of an AI upper body 212 with respect to a base assembly 211 may allow an AI device housing 208 to follow and/or track a sun or light source. In embodiments, thus a lighting support frame or lighting fabric 203 may also be able to provide protection from the sun and/or heat by being moved and/or tracking the sun because of an AI upper body 212 rotation.

Although FIG. 6 illustrates that a motor controller 611, a motor 610, a driving assembly or shaft 612 and/or a gearing assembly 613 may be located in a base assembly 211 and a gearing assembly 614 and/or a connector or plate 615 may be located in a AI device body or upper body 212, any of the components may be placed in or be resident in the other assembly (e.g., different components (e.g., gearing assembly 614 and/or a connector or plate 615) may be placed and/or positioned in a base assembly 211 and other components (e.g., motor controller 611, a motor 610, a driving assembly or shaft 612 and/or a gearing assembly 613) may be placed and/or positioned in a AI device body or upper body 212. In either configuration, an AI device body or upper body 212 may rotate about a base assembly 211, and this may provide additional flexibility in generating illustration or light providing protection to assist in illuminating dark areas around an AI device and lighting system.

Referring back to FIG. 2, a lighting support assembly or lighting stem assembly 205 may comprise one or more support arms. For example, as illustrated in FIG. 2, two support arms may be utilized to connect a lighting support frame assembly or lighting support fabric 203 to an AI device housing 208 (although one, three, four, five or six support arms may also be utilized). In embodiments, a motor assembly may cause one or more lighting support assemblies or lighting support stems 205 to move to different positions to allow an AI device housing 208 to provide illumination and/or light from a number of different positions and/or orientations. In embodiments, movement or one or more lighting support assemblies or lighting stems 205 (or support arms) may tilt a lighting frame, lighting frame assembly or lighting fabric 203 in a specific direction (away from or towards a building and/or a sun), such as illustrated by reference number 291 in FIG. 2. In embodiments, a motor controller may receive commands, instructions, messages or signals requesting movement of a lighting frame or lighting frame assembly or lighting fabric 203 and may generate commands and/or signals to cause a motor to turn, a shaft to rotate and engage a gearing assembly, causing a gearing assembly to turn. In embodiments, a gearing assembly may be attached to a lighting support assembly or lighting support stem 205 and may cause movement of one or more lighting support lighting frame or lighting frame assembly or lighting fabric 203. In embodiments, a lighting frame, lighting frame assembly and/or lighting fabric 203 may be expandable. In embodiments, a lighting frame, lighting frame assembly and/or lighting fabric 203 may one length and/or width in one position (e.g., a rest position) and may expand and have a larger length and/or width in other positions (e.g., when deployed and protecting an AI device housing 208 from a weather or other environmental conditions). This may be referred to as expanding shade.

In embodiments, a lighting frame assembly In embodiments, solar cells, solar panels and/or solar arrays 204 may be mounted on and/or integrated into a lighting frame and/or lighting fabric 203. In embodiments, solar cells, solar panels and/or solar arrays 204 may generate solar energy from a sun and convert the solar energy into electrical energy (e.g., voltage and/or current). In embodiments, electrical energy generated by one or more solar cells, solar panels and/or solar cell arrays 204 may charge and/or provide power to a rechargeable power source (e.g., a rechargeable battery) in an AI device housing 208 (although a rechargeable battery may be positioned within or located within a lighting support assembly or lighting stem 105 and/or lighting frame assembly or lighting fabric 103). In embodiments, a rechargeable power source 234 in an AI device housing 208 may provide power to components (e.g., memories 228, transceivers 230 231 232, processors 227, and/or microphones 229, etc.) and/or assemblies in an AI device housing 208, a lighting support assembly or lighting support stem 205 and/or lighting frame and/or lighting fabric 203.

In embodiments, an AI and lighting system 200 may comprise one or more lighting elements and/or assemblies 270. In embodiments, one or more lighting elements and/or assemblies 270 may resident and/or integrated into a lighting frame assembly or lighting fabric 203. In embodiments, one or more lighting elements and/or assemblies 270 may be integrated into and/or resident on a lighting support assembly 205 and/or an AI device housing 208. In embodiments, one or more lighting elements and/or assemblies 270 may provide illumination and/or light into dark environments and/or low light environments. More detailed description of operation of lighting elements and/or assemblies is provided below with respect to FIG. 11.

Figure 3:
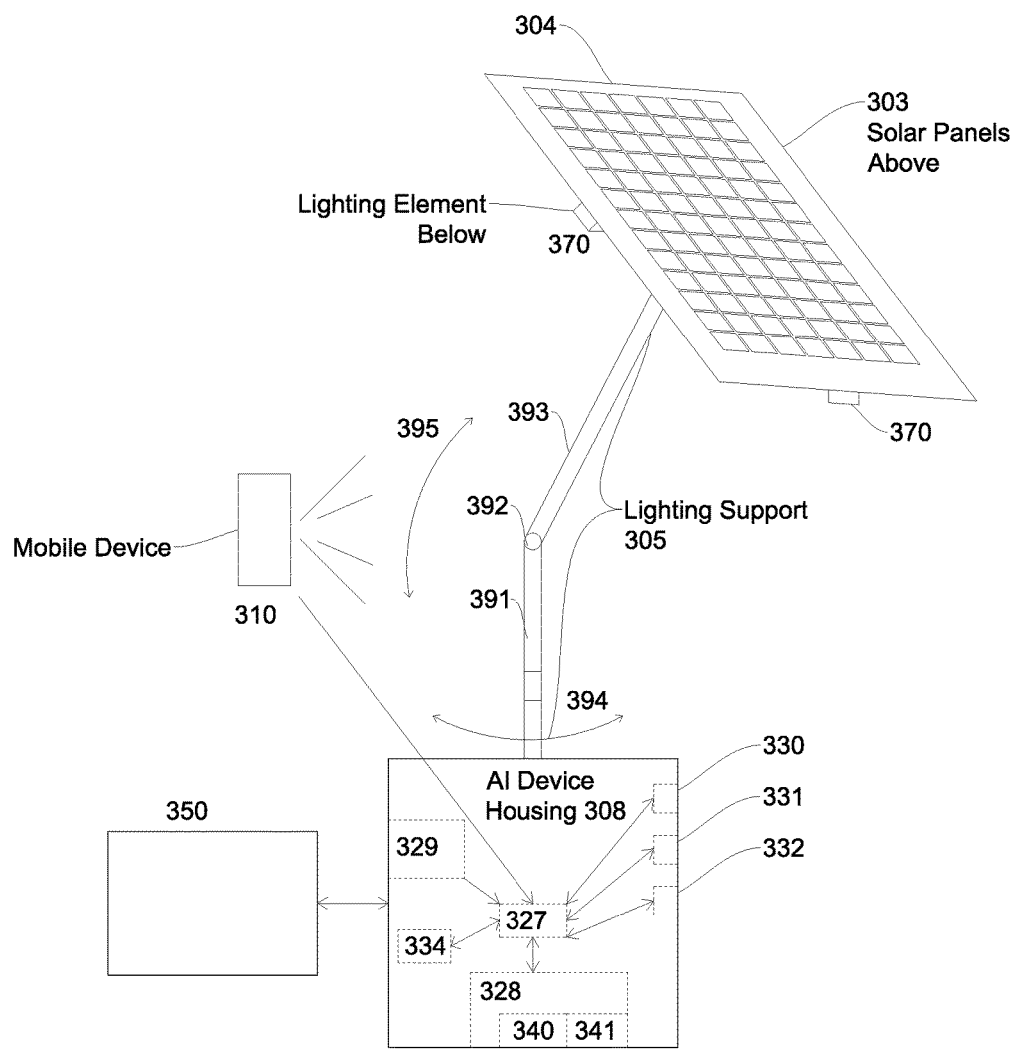
FIG. 3 illustrates an AI device and lighting system with a hinging support assembly according to embodiments.

FIG. 3 illustrates an AI Device and Lighting System according to embodiments. The operation of components (transceivers, imaging devices, sensors, microphones, processors, speakers, audio transceivers, and/or computer-readable instructions) in AI device housing 308 is similar to that as described above with respect to FIGS. 1 and 2. FIG. 3's AI device (or housing) and lighting system 300 comprises a hinged lighting support, lighting support assembly and/or lighting stem assembly 305. In embodiments, a hinged lighting support, lighting support assembly and/or lighting stem assembly 305 may comprise a first lighting support or lighting stem assembly 391, a hinging assembly 392 and/or a second lighting support or lighting stem assembly 393. In embodiments, a first lighting support assembly or lighting stem 391 may rotate with respect to an AI device housing 308 as is illustrated by reference number 394 (and thus the lighting frame or lighting frame assembly or lighting fabric 303, the hinging assembly 392 and the second lighting support or lighting stem assembly 393 may also rotate with respect to the AI device or lighting housing 308). In embodiments, reference number 394 may represent a clockwise and/or counterclockwise circular rotation and/or an azimuth rotation. In embodiments, this axial rotation may be from 0 to 360 degrees in rotation. In embodiments, a second lighting support or lighting stem assembly 393 may rotate about a first lighting support or lighting stem assembly 391 utilizing a hinging assembly 392. In embodiments, a rotation of a second lighting support or lighting stem assembly 393 about a first lighting support or lighting stem assembly 391 using a hinging assembly 392 is illustrated by reference number 395 in FIG. 3. In embodiments, a hinging assembly 392 may allow rotation of a second lighting support or lighting stem assembly 393 with respect to a first lighting support or lighting stem assembly 391 approximately 0 to 180 degrees.

In embodiments, rotation of a second lighting support or lighting stem assembly 393 with respect to a first lighting support or lighting stem assembly 391 via a hinging assembly 392 may take place utilizing a first motor assembly. In embodiments, a first motor assembly comprises a first motor shaft that may rotate in response to activation and/or utilization of a first motor. In embodiments, a first motor shaft may be mechanically coupled (e.g., via a gearing system, a friction-based system, etc.) to a force transfer shaft. In embodiments, a first motor shaft may rotate in a clockwise and/or counterclockwise direction and in response, a force transfer shaft may rotate in a same and/or opposite direction. In embodiments, a force transfer shaft may pass may be mechanically coupled to a receptacle in an AI device housing 308. In response to, or due to, rotation of force transfer shaft in a receptacle in an AI device housing 308, a first lighting support or lighting stem assembly 391 (and thus a lighting frame or lighting frame assembly or lighting fabric 303, plus a hinging assembly 392 and a second lighting support or lighting stem assembly 393) may rotate with respect to the AI device housing 308. In embodiments, a first motor may be coupled to a gearbox assembly. In embodiments, a gearbox assembly may comprise a planetary gearbox assembly. A planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor may be connected and/or adhered to a first lighting support assembly or lighting stem assembly 391. In embodiments, a first motor and gearbox assembly may be resident within an AI device housing 308. In embodiments, an output shaft from a gearbox assembly may be connected to an AI device and housing 308 (e.g., an opening or receptacle of the housing) and/or a first lighting support assembly or lighting stem assembly 391. In embodiments, because an AI device housing 308 may be stationary, torque on an output shaft of a gearbox assembly may be initiated by a first motor to cause a first lighting support assembly or lighting stem assembly 391 (and thus a lighting frame or lighting frame assembly or lighting fabric 303) to rotate. In embodiments, other gearbox assemblies and/or hinging assemblies may also be utilized to utilize an output of a motor to cause a first lighting support assembly or lighting stem assembly 391 (and hence lighting frame or lighting frame assembly or lighting fabric 303) to rotate with respect to an AI device and lighting housing 308. This may be referred to as an azimuth rotation and may be up to 360 degrees in rotation. In embodiments, a first motor may comprise a pneumatic motor, a servo motor and/or a stepper motor.

In embodiments, a first lighting support or lighting stem assembly 391 may be coupled and/or connected to a second lighting support or lighting stem assembly 393 via a hinging assembly 392. In embodiments, a lighting support 305 may comprise a first lighting support or lighting stem assembly 391, a second gearbox assembly (or a linear actuator or hinging assembly) 392, a second lighting support or lighting stem assembly 393, a second motor, and/or a second motor controller. In embodiments, a second motor assembly may comprise a second motor controller and a second motor, and may be a second gearbox assembly or linear actuator. In embodiments, a lighting support assembly 305 may also comprise a motor control which may have a second motor controller mounted and/or installed thereon. In embodiments, a second lighting support assembly or lighting stem assembly 393 may be coupled or connected to a first lighting support assembly or lighting stem assembly 391 via a hinging assembly 392 (e.g., a second gearbox assembly). In embodiments, a second gearbox assembly and a second motor connected thereto, may be connected to a first lighting support assembly or lighting stem assembly 391. In embodiments, an output shaft of a second gearbox assembly may be connected to a second lighting support assembly or lighting stem assembly 393. In embodiments, as a second motor operates and/or rotates, a second gearbox assembly rotates an output shaft which causes a second lighting support assembly or lighting stem assembly 393 to rotate (either upwards or downwards) at a right angle from, or with respect to, a first lighting support or lighting stem assembly 391. In embodiments, utilizing a linear actuator as a hinging assembly 392, a steel rod may be coupled to a second lighting support assembly or lighting stem assembly 393 and/or a first lighting support or lighting stem assembly 391 may cause a free hinging between a second lighting support assembly or lighting stem assembly 393 and a first lighting support assembly or lighting stem assembly 391. In embodiments, a linear actuator may be coupled, connected, and/or attached to a second lighting support assembly or lighting stem assembly 393 and/or first lighting support or lighting stem assembly 391. In embodiments, as a second motor operates and/or rotates a steel rod, a second lighting support assembly or lighting stem assembly 393 moves in an upward or downward direction with respect to a hinged connection (or hinging assembly) 392. This may be referred to as an elevation motor rotation.

In embodiments, a first lighting support or lighting stem assembly 391 may comprise an elevation motor, an elevation motor shaft, a worm gear, and/or a speed reducing gear. In embodiments, a speed reducing gear may be connected with a connector to a connection plate. In embodiments, a first lighting support assembly or lighting stem assembly 391 may be mechanically coupled to a second lighting support assembly or lighting stem assembly 393 via a connection plate. In embodiments, a connection plate may be connected to a second lighting support or lighting stem assembly 393 via a connector and/or fastener. In embodiments, an elevation motor may cause rotation (e.g., clockwise or counterclockwise) of an elevation motor shaft, which may be mechanically coupled to a worm gear. In embodiments, rotation of an elevation motor shaft may cause rotation (e.g., clockwise or counterclockwise) of a worm gear. In embodiments, a worm gear may be mechanically coupled to a speed reducing gear. In embodiments, rotation of a worm gear may cause rotation of a speed reducing gear via engagement of channels of a worm gear with teeth of a speed reducing gear. In embodiments, a sped reducing gear may be mechanically coupled to a connection plate to a second support assembly via a fastener or connector. In embodiments, rotation of a speed reducing gear may cause a connection plate (and/or a second lighting support assembly or lighting stem assembly 393) to rotate with respect to a first lighting support or lighting stem assembly 391 in a clockwise or counterclockwise direction as is illustrated by reference number 395. In embodiments, a second lighting support or lighting stem assembly 393 may rotate with respect to a first lighting support or lighting stem assembly 391 approximately 90 degrees or 180 degrees via movement of the connection plate. In embodiments, a second support assembly or lighting stem assembly 393 may rotate approximately 0 to 60 or 0 to 120 degrees with respect to a first lighting support assembly or lighting stem assembly 391 via movement of the connection plate.

In embodiments, solar cells, solar panels and/or solar arrays 304 may be mounted on and/or integrated into a lighting frame assembly and/or lighting fabric 303. In embodiments, solar cells, solar panels and/or solar arrays 304 may generate solar energy from a sun and convert the solar energy into electrical energy (e.g., voltage and/or current). In embodiments, electrical energy generated by one or more solar cells, solar panels and/or solar cell arrays 304 may charge and/or provide power to a rechargeable power source (e.g., a rechargeable battery) in an AI device housing 308 (although a rechargeable battery may be positioned within or located within a lighting support assembly or lighting stem assembly 305 (e.g., a first lighting support assembly 391 and/or a second lighting support assembly 393) and/or lighting frame assembly or lighting fabric 303). In embodiments, a rechargeable power source 334 in an AI device housing 308 may provide power to components (e.g., memories 328, transceivers 330 331 332, processors 327, and/or microphones 329, etc.) and/or assemblies in an AI device housing 308, a lighting support assembly or lighting support stem 305 and/or lighting frame and/or lighting fabric 303.

In embodiments, an AI and lighting system 300 may comprise one or more lighting elements and/or assemblies 370. In embodiments, one or more lighting elements and/or assemblies 370 may resident and/or integrated into a lighting frame assembly or lighting fabric 303. In embodiments, one or more lighting elements and/or assemblies 370 may be integrated into and/or resident on a lighting support assembly 305 (e.g., a first lighting support assembly 391 or a second lighting support assembly 393) and/or an AI device housing 308. In embodiments, one or more lighting elements and/or assemblies 370 may provide illumination and/or light into dark environments and/or low light environments. More detailed description of operation of lighting elements and/or assemblies is provided below with respect to FIG. 10.

FIG. 7A illustrates an AI Device and Lighting System with a movable base assembly according to embodiments. In embodiments, an AI and lighting system 700 may comprise a movable base assembly 710, an AI device body 707, a lighting support assembly or lighting stem assembly 730 and/or a lighting frame or lighting frame assembly or lighting fabric 740. In embodiments, an AI device housing 708 may comprise a movable base assembly 710 and/or an AI device body 707. In embodiments, a movable base assembly 710 may be integrated as part of an AI device or lighting housing 708. In embodiments, as described in FIGS. 2 and 6, an AI device body 707 may rotate about a movable base assembly 710. However, in alternative embodiments, an AI device body 707 and a movable base assembly 710 may be integrated and there may be no rotating of a AI device body 707 with respect to a movable base assembly. In embodiments, a movable base assembly 710 may comprise a base motor controller 715, a base motor 716, a drive assembly 717 and/or one or more wheels (or base driving assemblies) 718. In embodiments, a base assembly or movable base assembly 710 may comprise one or more environmental sensors 721 and/or one or more directional sensors 722. In embodiments, a movable base assembly 710 may also comprise one or more proximity sensors 719. In embodiments, a base assembly or movable 710 may comprise one or more processor or controllers 711, one or more memory modules or memories 712 and/or computer readable instructions 713, where the computer-readable instructions are fetched, read and/or accessed from the one or more memory modules or memories 712 and executed by the one or more processor or controllers 711 to perform a number of functions. In embodiments, a base assembly or movable base assembly 710 may comprise one or more separate wireless transceivers 714. In embodiments, a base assembly or movable base assembly 710 may comprise one or more cameras 726. In embodiments, the one or more cameras 726, one or more wireless transceivers 714, one or more memory modules or memories 712, one or more proximity sensors 719, one or more direction sensors 722 and/or one or more environmental sensors 721 may be in addition to similar or same devices located on the AI device housing 708, the lighting support assembly or lighting stem assembly 705 and/or lighting frame or lighting frame assembly or lighting fabric 703. In embodiments, operation and/or utilization of these sensors and/or devices are similar to that described with respect to FIGS. 1, 2 and 5.

In embodiments, a base assembly or movable base assembly 710 may move around a surface (e.g., an indoor surface, a ground surface, a floor, a patio, a deck, and/or outdoor surface) based at least part on environmental conditions. In embodiments, a base assembly or movable base assembly 710 may move based on pre-programmed settings or instructions stored in one or more memories 712 of a movable base assembly 710 or memory 228 of an AI device housing 708. In embodiments, a base assembly or movable base assembly 710 may move based on pre-programmed settings or instructions stored in one or more memories 228 of an AI device and/or lighting housing 708 and/or one or more memories 712 of a movable base assembly 710. In embodiments, a movable base assembly 710 may move around a surface in response to commands, instructions, messages or signals communicated from portable computing devices (e.g., mobile phone, smart phone, laptops, mobile communication devices, mobile computing devices and/or tablets). In embodiments, a base assembly or a movable base assembly 710 may move around a surface in response to voice commands. In embodiments, for example, a base assembly or movable base assembly 710 may move to track environmental conditions (e.g., the sun, wind conditions, humidity conditions, temperature conditions) and/or may move in response to an individual's commands. In embodiments, a base assembly or movable base assembly 710 may move around a surface based at least in part (or in response to) sensor readings. In embodiments, a movable base assembly 710 may move around a surface based at least in part on images captured and received by cameras located on a base assembly 710, an AI device or lighting system 700, and/or a portable computing device and/or a server (or computing device) 729.

In embodiments, computer-readable instructions 713 stored in one or more memories 712 of a base assembly or movable base assembly 710 may be executed by one or more processors 711 and may cause movement of the base assembly based on or according to pre-specified conditions and/or pre-programmed instructions. In embodiments, for example, a movable base assembly 710 of an AI Device and Lighting System 700 may move to specified coordinates at a specific time based on the stored computer-readable instructions 713 stored in one or more memories 712. For example, a movable base assembly 710 may move 10 feet to the east and 15 feet to the north at 8:00 am based on stored computer-readable instructions 713. Similarly, for example, a movable base assembly 710 may move to specified coordinates or locations at a specific time based on computer-readable instructions 713 stored in one or more memories 712 of an AI device housing 708.

In embodiments, for example, a movable base assembly 710 may move to specified coordinates and/or location based upon other conditions (e.g., specific days, temperatures, humidity, latitude and longitude, and other devices being in proximity) that may match conditions or be predicted on conditions stored in the computer-readable instructions 713 stored in the one or more memories 712 of a base assembly. For example, a movable base assembly 710 may move if it is 9:00 pm and/or if it is a Saturday. Similarly, the computer-readable instructions 240 may be stored in one or more memories 712 of an AI device housing and instructions, commands and/or messages may be communicated to a motor controller 715 in a movable base assembly 710.

In embodiments, a motor controller and/or a processor 711 in a AI device housing 708 may communicate instructions, commands, signals and/or messages related to or corresponding to base assembly 710 movement directly to a base motor controller 715 and/or indirectly through a processor or controller 711 to a base motor controller 715. For example, a motor controller and/or processor 715 in an AI device or lighting housing may communicate instructions and/or messages to a base motor controller 715 which may result in a movable base assembly 710 moving 20 feet sideways. In embodiments, communication may pass through a transceiver 714 to a base motor controller 715. In embodiments, communications may pass through a base assembly controller or processor 711 to a base motor controller 715. In embodiments, computer-readable instructions stored on one or more memory modules or memories 712 of an AI device housing 708, may cause a processor 711 in an AI device housing 708 to receive one or more measurements from one or more sensors (including wind, temperature, humidity, air quality, directional sensors (GPS and/or digital compass) in an AI device housing 708, one or more lighting support assemblies or lighting support stems 705, and/or one or more lighting frame or lighting frame assembly or lighting fabric 703; analyze the one or more received measurements; generate commands, instructions, signals and/or messages; and communicate such commands, instructions, signals and/or messages to a base assembly 710 to cause a base assembly 710 to move. For example, based on wind sensor or temperature sensor measurements, computer-readable instructions executed by a processor 711 of an AI device and lighting housing 708 may communicate messages to a base motor controller 715 in a base assembly 710 to cause the base assembly 710 to move away from a detected wind direction and/or condition. For example, based on received solar power measurements (from one or more solar panel assemblies) and/or a directional sensor reading (e.g., a digital compass reading or GPS reading), a processor 711 executing computer-readable instructions in an AI device housing 708 may communicate messages and/or instructions to a base motor controller 715 to cause a base assembly 710 to automatically move in a direction where solar panels may capture more solar power. This provides an AI device with lighting system 800 with an advantage because not only can an AI device with lighting system rotate towards an area of interest (e.g., via a motor assembly in an AI device housing 708), an entire AI device with lighting also has an ability to move to an area where no obstacles or impediments are present, or where no unfavorable conditions are present because the base assembly 710 is movable from one location to another.

In embodiments, a portable or mobile computing device 723 (e.g., smart phone, mobile communications device, a laptop, and/or a tablet) and/or a computing device 729 may transmit commands, instructions, messages and/or signals to a base assembly 710 identifying desired movements of a base assembly 710. In embodiments, a portable or mobile computing device 723 and/or a computing device 729 may comprise computer-readable instructions stored in a memory of a portable computing device 723 or computing device 729 and executed by a processor (e.g., SMARTSHADE software) that communicates with an AI Device with Lighting System 700 as is described supra herein. In embodiments, computer-readable instructions executed by a processor of a mobile computing device 723 may be part of a client-server software application that also has computer-readable instructions stored on a server and executed by a processor of a server (e.g., computing device 729). In embodiments, computer-readable instructions executed by a processor of a mobile computing device 723 may be part of a client-server software application that also has computer-readable 713 instructions stored on a memory 712 and executed by a processor 711 of an AI device housing 708 of an AI device and lighting system 700. In other words, not all of the computer-readable instructions may be stored on a mobile computing device 723. In embodiments, a computer-readable instructions executed by a processor of a mobile computing device 723 may communicate instructions, commands and/or messages directly to a base assembly 710 via a wireless transceiver (e.g., a wireless transceiver 724 on a mobile computing device 723 may communicate commands and/or messages to a transceiver 714 on a base assembly 710).

In embodiments, voice commands may be converted on a mobile computing device 723 and instructions and/or messages based at least in part on the voice commands may be transmitted (e.g., via a wireless transceiver 724) to a base assembly motor controller 715 directly (e.g., through a wireless transceiver 714), or indirectly via a wireless transceiver 714 and/or a base assembly processor 711 to automatically move a base assembly 710 in a specified direction and/or distance or to specified coordinates. In embodiments, a mobile computing device 723 may communicate instructions, messages and/or signals corresponding to voice commands and/or audio files to a base assembly motor controller 715 directly, or indirectly as described above. In embodiments, where audio files are received, computer-readable instructions 713 stored in a base assembly memory 712 may be executed by a base assembly processor 711 to convert the voice commands into instructions, signals and/or messages recognizable by a base assembly motor controller 715. Similarly, if audio files are received by one or more processors 711 in an AI device housing 708, computer-readable instructions 713 stored in one or more memories 712 may be executed by an AI device housing processor 711 to convert voice commands into instructions, signals and/or messages recognizable by a base assembly motor controller 715. In embodiments, computer-readable instructions executed by a processor on a mobile computing device 723 may present a graphical representation of a base assembly 710 on a mobile computing device display. In embodiments, a mobile computing device 723 may receive commands via a user interface from a user representing directions and/or distance to move a base assembly (e.g., a user may select a graphic representation of a base assembly on a display of a mobile computing device 723 and indicate that it should move to a left or east direction approximately 15 feet) and computer-readable instructions executed by a processor a mobile computing device 723 may communicate commands, instructions and/or messages representative of a base assembly movement directions and/or distance directly and/or indirectly to a base assembly motor controller 715 to cause movement of a base assembly 710 in the selected direction and/or distance. Similarly, the mobile computing device 723 may communicate commands, instructions and/or messages to a processor in an AI device and lighting housing 708, which in turn will communicate commands, instructions and/or messages to a to a base assembly motor controller 715 to cause movement of a base assembly 710 in the selected direction and/or distance. This feature may provide an advantage of independently moving a base assembly 710 (and thus an AI device and lighting system 700) from a remote location without having to be next to or in proximity to a base assembly.

In embodiments, a transceiver 714 and/or a transceiver may be a WiFi (e.g., an 802.11 transceiver), a cellular transceiver, and/or a personal area network transceiver (e.g., Bluetooth, Zigbee transceiver) so that a mobile computing device 723 (and its wireless transceiver 724) may communicate with a base assembly 710 via a number of ways and/or protocols. In embodiments, a mobile computing device 723 may utilize an external server (e.g., a computing device or server computer 729) to communicate with a base assembly 710.

Figure 7B:
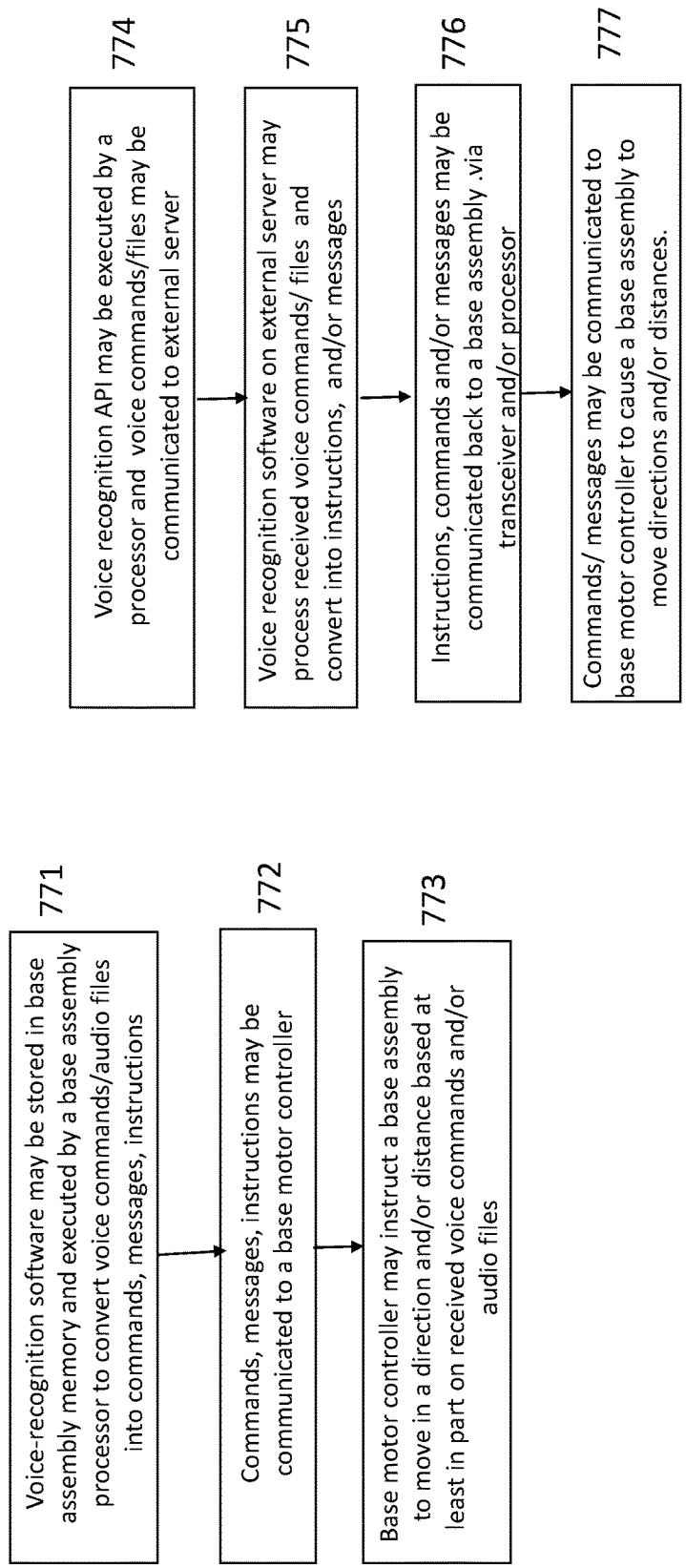
FIG. 7B is a flowchart illustrating base assembly movement according to voice commands according to embodiments.

FIG. 7B is a flowchart illustrating base assembly movement according to voice commands according to embodiments. In embodiments, a base assembly 710 may move in response to voice commands. In embodiments, voice-recognition software (e.g., computer-readable instructions) may be stored in a memory 712 of a base assembly and executed by one or more base assembly processors 711 to convert 771 actual voice commands (spoken by an operator) or received voice audio files into messages, instructions and/or signals which can then be communicated 772 to a base motor controller 715. In embodiments, a base motor controller 715 may generate commands or messages and communicate commands or messages 773 a base assembly 710 to move in a direction and/or distance based at least in part on received voice commands and/or audio files. In embodiment, a voice recognition application programming interface (API) may be stored in one or more memory 712 of a base assembly 710. In embodiments, a voice recognition API may be executed by a processor 711 and voice commands and/or voice audio files from a base assembly may be communicated 774 to an external server (e.g., via a wireless transceiver 714) or other network interface. In embodiments, voice recognition software may be present or installed on an external server (e.g., computing device 729) and may process 775 the received voice commands and/or voice audio files and convert the processed voice files into instructions and/or messages, which may then be communicated 776 back to a base assembly 710. In embodiments, the communicated instructions, commands and/or messages from an external voice recognition server (e.g., computing device 729) may be received at a base assembly 710 and transferred and/or communicated (e.g., via a transceiver 714 and/or a processor 711) 777 to a base motor controller 715 to cause a base assembly 710 to move directions and/or distances based at least in part on the received voice commands. Similarly, voice recognition of received voice commands and/or audio files, as discussed above, may be performed at an AI device and lighting housing 708 (e.g., utilizing computer-readable instructions 713 stored in one or more memories 712) and/or at a mobile computing device 723 (e.g., utilizing computer-readable instructions stored in memories of a mobile computing device 723) or combination thereof, and converted instructions, commands and/or messages may be communicated to a base motor controller 715 to cause movement of a base assembly in specified directions and/or distances. The ability of a base assembly 710 to move in response to voice commands provides an advantage of a lighting system that is able to respond and/or to move quickly (and be communicated with via a variety of interfaces) with specific and customizable instructions without having a user physically exert themselves to move an umbrella and/or lighting system to a proper and/or desired position.

Figure 7C:
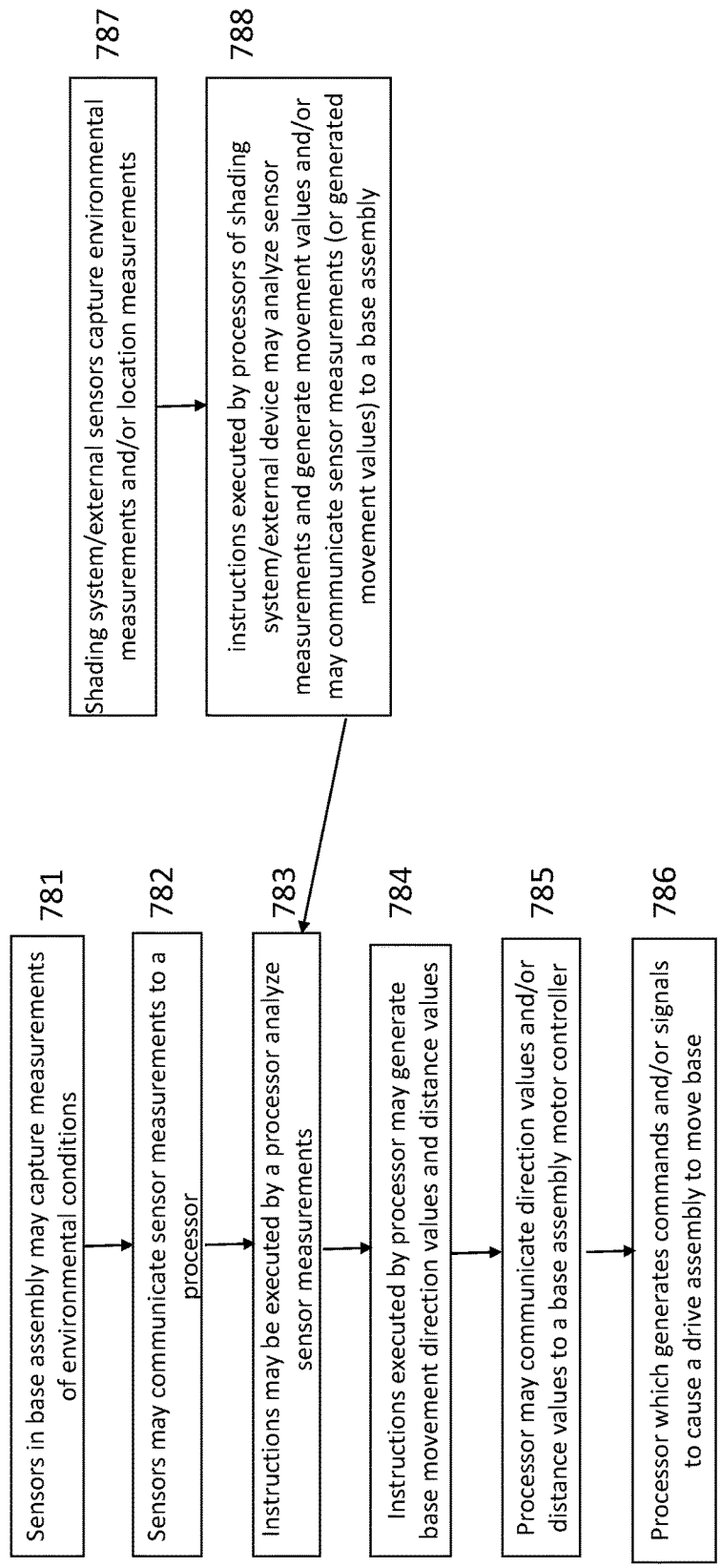
FIG. 7C illustrates movement of a base assembly according to sensor measurements according to embodiments.

FIG. 7C illustrates movement of a base assembly according to sensor measurements according to embodiments. In embodiments, a base assembly 710 may comprise one or more sensors (e.g., environmental sensors 721 (wind, temperature, humidity and/or air quality sensors); directional sensors 722 (e.g., compass and/or GPS sensors); and/or proximity sensors 719. In embodiments, in addition or as an alternative, an AI device or lighting housing 708 may comprise one or more environmental sensors, directional sensors and/or proximity sensors mounted thereon and/or installed therein. In embodiments, in addition or as an alternative, an external hardware device (e.g., a portable computing device 723) or other computing devices (e.g., that are part of home security and/or office building computing systems or computing device 729) may comprise directional sensors, proximity sensors, and/or environmental sensors that communicate with an AI device and lighting system 700 and/or a base assembly 710. In embodiments, sensors 722 may be located within a base assembly 710 may capture 781 measurements of environmental conditions and/or location information adjacent to and/or surrounding the base assembly 710. In embodiments, one or more sensors 722 may communicate 782 sensor measurements to one or more processors and/or controllers 711. In embodiments, computer-readable instructions 713 stored in a memory 712 of a base assembly may be executed by one or more processors and/or controllers 711 and may analyze 783 sensor measurements. In embodiments, based on the analyzation of sensor measurements, computer-readable instructions 713 may generate 784 movement direction values and distance values and/or instructions for a base assembly 710. In embodiments, computer-readable instructions executed by one or more processors/controllers 711 may communicate 785 the generated direction values and/or distance values and/or instructions to a base assembly motor controller 715, which generates messages, commands, and/or signals to cause 786 a drive assembly (e.g., a motor, shaft and/or wheels or a motor, shaft and/or treads) to move a base assembly 710 based at least in part on the generated direction values and/or distance values and/or instructions.

In embodiments, environmental sensors and/or directional sensors may be located on an AI device and lighting housing 808, external hardware devices (e.g., portable computing device 723) and/or external computing devices (e.g., computing device or server 729). In embodiments, lighting device system sensors and external device sensors may capture 787 environmental measurements (e.g., wind, temperature, humidity, air quality) and/or location measurements (e.g., latitude and/or longitude; headings, altitudes, etc.) and may communicate captured measurements or values to processors and/or controllers in respective devices (e.g., AI device and lighting housing 708, portable computing device 723 or external computing devices 729). In embodiments, computer-readable instructions executed by processors and/or controllers of an AI device and lighting housing 708, portable computing device 723 and/or external computing device 729 may analyze sensor measurements and generate movement values or instructions (e.g., direction values and/or distance values) and/or may communicate sensor measurements (or generated movement values or instructions) 788 to a base assembly 710 utilizing transceivers in intelligent shading systems, portable computing devices (e.g., transceiver 723) and/or external computing devices (e.g., computing device 729) and one or more base assembly transceivers 714. In other words, either sensor measurements, analyzed sensor measurements and/or movement instructions may be communicated to a base assembly 710. In embodiments, some or all of the steps of 783-786 may be repeated for the received sensor measurements and/or movement instructions received from an AI device and lighting housing sensors, external hardware device sensors, portable computing device sensors and/or external computing device sensors, which results in movement of a base assembly 710 based on the received sensor measurements or instructions.

Figure 7D:
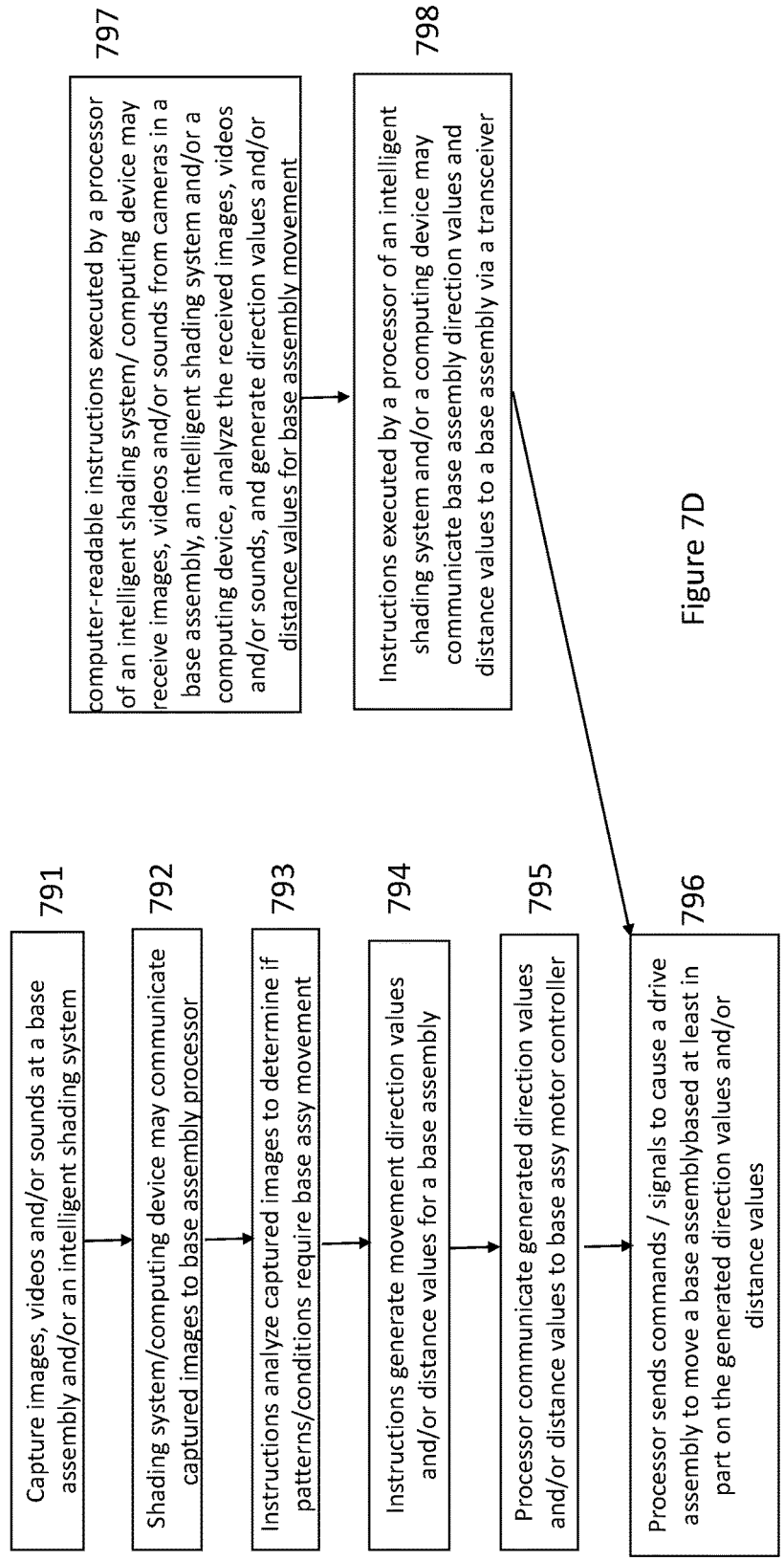
FIG. 7D illustrates movement of a base assembly utilizing a camera and/or pattern recognition and/or image processing according to embodiments.

FIG. 7D illustrates movement of a base assembly utilizing a camera and/or pattern recognition and/or image processing according to embodiments. In embodiments, a base assembly or movable base assembly 710 may comprise one or more cameras 726 and may utilize pattern recognition and/or image processing to identify potential base movement. In embodiments, in addition or as an alternative, an AI device and lighting housing 708 may comprise one or more cameras 739 located thereon and/or within and may communicate images, video and/or sound with a base assembly 710. In embodiments, in addition or as an alternative, an external hardware device (e.g., a portable computing device 723) or other computing devices 729 (e.g., that are part of home security and/or office building computing systems) may comprise one or more cameras that communicate images, videos and/or sounds/audio to an AI device and lighting housing 708hi and/or a base assembly 710.

In embodiments, one or more cameras 726 located within a base assembly 710, one or more cameras 126 in an AI device and shading system, a portable computing device 723 and/or a remote computing or hardware device (e.g., 729)

may capture 791 images, videos and/or sounds adjacent to and/or surrounding a base assembly 710 and/or AI device lighting housing or body 207. In embodiments, one or more cameras 726 in a base assembly 710, one or more cameras in other portions of an AI device and lighting system 700, one or more cameras in a portable computing device 723 and/or remote computing device (e.g., computing device 729) may communicate 792 captured images to one or more processors and/or controllers 711 in a base assembly 710. In embodiments, computer-readable instructions 713 stored in one or more memories 712 of a base assembly 710 may be executed by one or more processors and/or controllers 711 and may analyze 793 captured images to determine if any patterns and/or conditions are recognized as requiring movement of an AI device and lighting system 700 via movement of a base assembly 710. In embodiments, based on the analyzation and/or pattern recognition of captured images, video and/or sounds, computer-readable instructions 713 may generate 794 movement direction values and/or distance values and/or instructions for a base assembly 710. In embodiments, computer-readable instructions executed by one or more processors 711 may communicate 795 generated direction values and/or distance values and/or instructions to a base assembly motor controller 715, which generates messages, commands, and/or signals to cause and/or activate 796 a drive assembly (e.g., a motor, shaft and/or wheels or a motor, shaft and/or treads) to move a base assembly 710 based at least in part on the generated direction values and/or distance values. In embodiments, computer-readable instructions executed by a processor of an AI device and lighting system, a portable computing device 723 and/or a computing device 729 may receive images, videos and/or sounds from one or more cameras on a base assembly 710, other portions of an AI device and lighting system 700, a portable computing device 723 and/or a computing device 729, analyze the received images, videos and/or sounds, and may generate 797 direction values and/or distance values or instructions for base assembly movement. In other words, image recognition or pattern recognition may be performed at any of the discussed assemblies or computing devices (e.g., base assembly 710, portable computing device 723, external computing device 729 and/or other portions of an AI device and lighting system 700. In embodiments, computer-readable instructions executed by processors of an AI device and lighting system 700, a mobile computing device 723 and/or a computing device 729 may communicate 798 base assembly direction values and distance values to a base assembly 710 via a transceiver.

In embodiments, a base assembly processor/controller 715 may receive generated direction values and/or distance values and/or instructions, which generates messages, commands, and/or signals to cause 796 a drive assembly (e.g., a motor, shaft and/or wheels or a motor, shaft and/or treads) to move a base assembly 710 based at least in part on the generated direction values and/or distance values and/or instructions.

In embodiments, one or more sensors 719, 721 and/or 722 in a base assembly 700 may generate sensor readings or measurements. In embodiments, a controller or processor and/or a transceiver 714 may communicate commands, instructions, signals and/or messages to a base motor controller 715 to identify movements and/or directions for a base assembly 710. In response, an AI device and lighting system controller send commands, instructions, and/or signals to a base assembly 710 identifying desired movements of a base assembly.

In embodiments, a base assembly 710 may comprise one or more processor/controllers 711, a motor controller 715, a motor 716 and/or a drive assembly 717 which physical move a base assembly 710. As described above, many different components, systems and/or assemblies may communicate instructions, commands, messages and/or signals to one or more processors 711 and/or a base assembly motor controller 715. In embodiments, the instructions, commands, messages and/or signals may correspond to, be related to and/or indicative of direction values and/or distance values that a base assembly 710 may and/or should move. In embodiments, a base motor controller 715 may receive direction values and distance values or instructions and convert these pulses into signals, commands and/or messages for a motor and/or turbine 716. In embodiments, a motor and/or turbine 716 may be coupled, attached and/or connected to a driving assembly 717. In embodiments, a driving assembly 717 may drive a base assembly 710 to a location based at least in part on direction values and/or distance values. In embodiments, a driving assembly 717 may comprise one or more shafts, one or more axles and/one or more wheels 718. In embodiments, a motor 716 generates signals to cause shafts to rotate, axles to rotate, and/or wheels to spin and/or rotate which causes a base assembly 710 to move. In embodiments, a driving assembly 717 may comprise one or more shafts, one or more conveying devices and one or more treads (e.g., tread assemblies). In embodiments, a motor 716 may generates signals, messages and/or commands to cause one or more shafts to rotate, which may cause one or more conveying devices to rotate, which in turns causes treads (and/or tread assemblies) to rotate and travel about a conveying device, where the one or more treads (and/or tread assemblies) cause a base assembly 710 to move.

In embodiments, a motor and drive assembly may be replaced by an air exhaust system and air exhaust vents. In embodiments, a motor controller 715 may be replaced by an exhaust system controller. In embodiments, an exhaust system controller may receive instructions, commands, messages and/or signals from a controller identifying movement distances and directional measurements for a base assembly 710. In embodiments, an exhaust system controller may convert the commands, messages and/or signals into signals and/or commands understandable by exhaust system components. In embodiments, an exhaust system (or exhaust system components) may control operation of air exhaust events on a base assembly 710 in order to move a base assembly a desired direction and/or distance. In embodiments, a base assembly 710 may hover and/or glide over a surface when being moved by operation of exhaust vents.

In embodiments, a SMARTSHADE and/or SHADECRAFT application) or a desktop computer application may transmit commands, instructions, and/or signals to a base assembly 710 identifying desired movements of a base assembly 710. In embodiments, a base motor controller 715 may receive commands, instructions, and/or signals and may communicate commands and/or signals to a base motor 716. In embodiments, a base motor 716 may receive commands and/or signals, which may result in rotation of a motor shaft. In embodiments, a motor shaft may be connected, coupled, or indirectly coupled (through gearing assemblies or other similar assemblies) to one or more drive assemblies. In embodiments, a drive assembly may be one or more axles, where one or more axles may be connected to wheels. In embodiments, for example, a base assembly may receive commands, instructions and/or signal to rotate in a counter-clockwise direction approximately 15 degrees. In embodiments, for example, a motor output shaft would rotate one or more drive assemblies rotate a base assembly approximately 15 degrees. In embodiments, a base assembly may comprise more than one motor and/or more than one drive assembly. In this illustrative embodiment, each of motors may be controlled independently from one another and may result in a wider range or movements and more complex movements.

In embodiments, solar cells, solar panels and/or solar arrays 704 may be mounted on and/or integrated into a lighting frame assembly and/or lighting fabric 703. In embodiments, solar cells, solar panels and/or solar arrays 304 may generate solar energy from a sun and convert the solar energy into electrical energy (e.g., voltage and/or current). In embodiments, electrical energy generated by one or more solar cells, solar panels and/or solar cell arrays 704 may charge and/or provide power to a rechargeable power source (e.g., a rechargeable battery) in an AI device housing 708 (although a rechargeable battery may be positioned within or located within a lighting support assembly or lighting stem assembly 705 and/or lighting frame assembly or lighting fabric 703). In embodiments, a rechargeable power source in an AI device housing 708 may provide power to components (e.g., memories 712, transceivers 714, processors 711, and/or microphones, etc.) and/or assemblies in an AI device housing 708, a lighting support assembly or lighting support stem 705 and/or lighting frame assembly and/or lighting fabric 703.

In embodiments, an AI and lighting system 700 may comprise one or more lighting elements and/or assemblies 770. In embodiments, one or more lighting elements and/or assemblies 770 may resident and/or integrated into a lighting frame assembly or lighting fabric 703. In embodiments, one or more lighting elements and/or assemblies 770 may be integrated into and/or resident on a lighting support assembly 705 and/or an AI device housing 708. In embodiments, one or more lighting elements and/or assemblies 770 may provide illumination and/or light into dark environments and/or low light environments. More detailed description of operation of lighting elements and/or assemblies is provided below with respect to FIG. 1.

Figure 8:
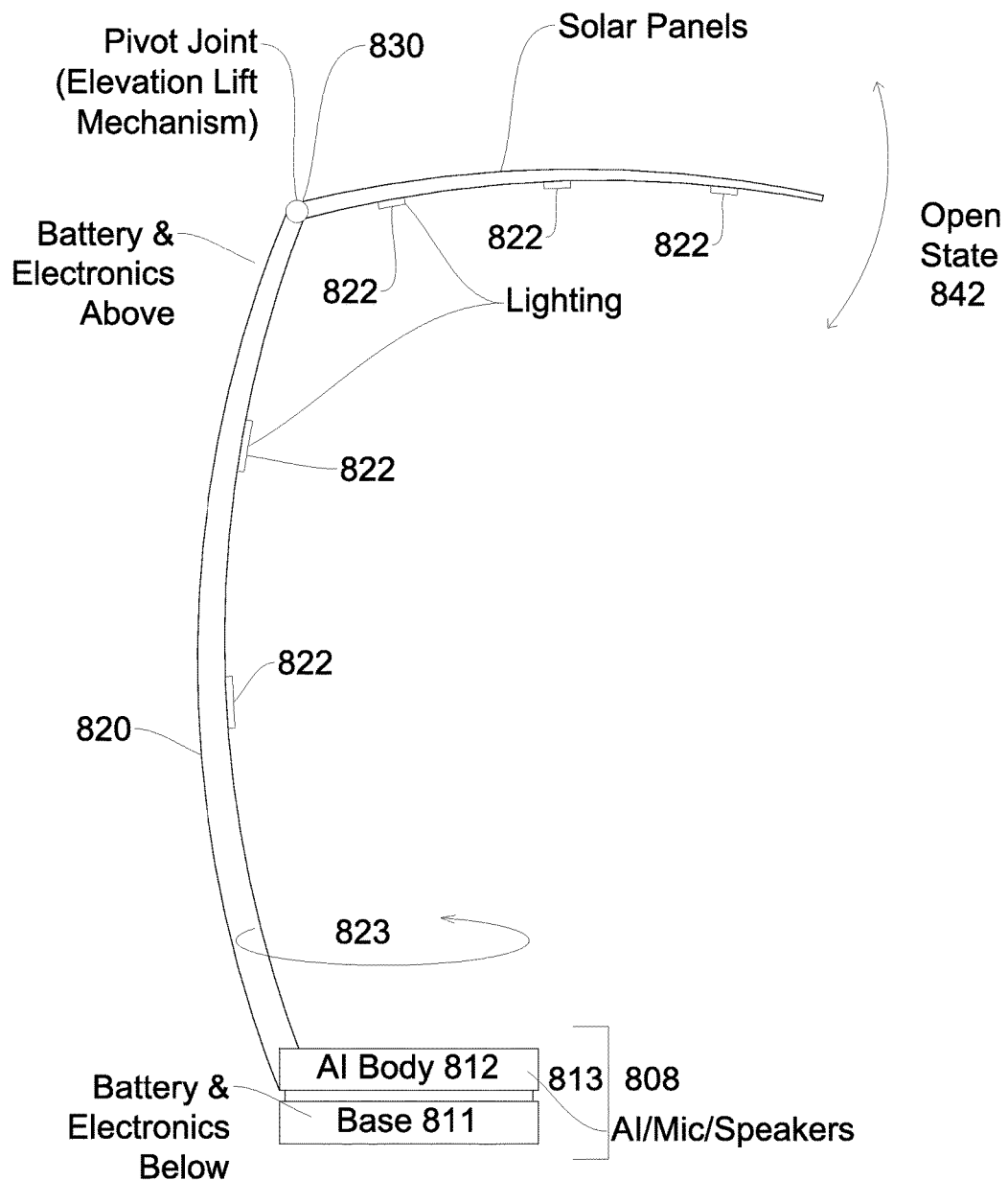
FIG. 8 illustrates an AI and lighting system using a cantilever design in an open or deployed position according to embodiments.

FIG. 8 illustrates an AI and lighting system using a cantilever design according to embodiments. In embodiments, an AI and lighting system 800 may comprise an AI and lighting housing 808, a first cantilever support assembly 820, a pivot joint 830 and a cantilever lighting support assembly 840. In embodiments, an AI and lighting housing 808 may comprise an upper housing AI body 812, a rotation assembly 813, and/or a lower housing body or base assembly 811. In embodiments, a lower housing body or base assembly 811 may comprise a rechargeable power supply. In embodiments, an upper housing or AI body 812 may comprise one or more processors, one or more memories, computer-readable instructions stored in the one or more memories, one or more microphones, and/or one or more sound reproduction devices (e.g., speakers). Operation of AI body 812 and base assembly 811 is similar to operation described above with respect to AI devices or AI housings (108, 208, 308) in FIGS. 1, 2 and 3. Operation of AI body 811, a rotation assembly 813, and/or a movable base assembly 811 may be similar in operation to base assembly, upper body and AI device housings described in FIGS. 2, 5, and 7, as discussed above.

In embodiments, a cantilever support assembly 820 may also comprise one or more lighting assemblies 822. In embodiments, a cantilever support assembly 820 may also comprise one or more sensors (e.g., environmental sensors, directional sensors, and/or proximity sensors). In embodiments, a cantilever support assembly 820 may also comprise one or more motor drive assemblies. In embodiments, a cantilever support assembly 820 may also comprise one or more imaging devices. In embodiments, a cantilever support assembly 820 may comprise one or more rechargeable power sources (e.g., rechargeable batteries). Operation of sensors, imaging devices, motor drive assemblies and/or power sources may be similar to that described above with respect to the AI device and lighting systems of FIGS. 1, 2, 5 and 7. In embodiments, a cantilever support assembly 820 (and thus a pivot joint 830 and a cantilever lighting support assembly 840) may rotate around an azimuth axis of an AI device housing 808, as is illustrated by reference number 823. In embodiments, rotation of a cantilever support assembly 820 with respect to an AI device housing may be similar to rotation of a support assembly and/or stem assembly described in FIGS. 2 and 3 above.

Figure 9:
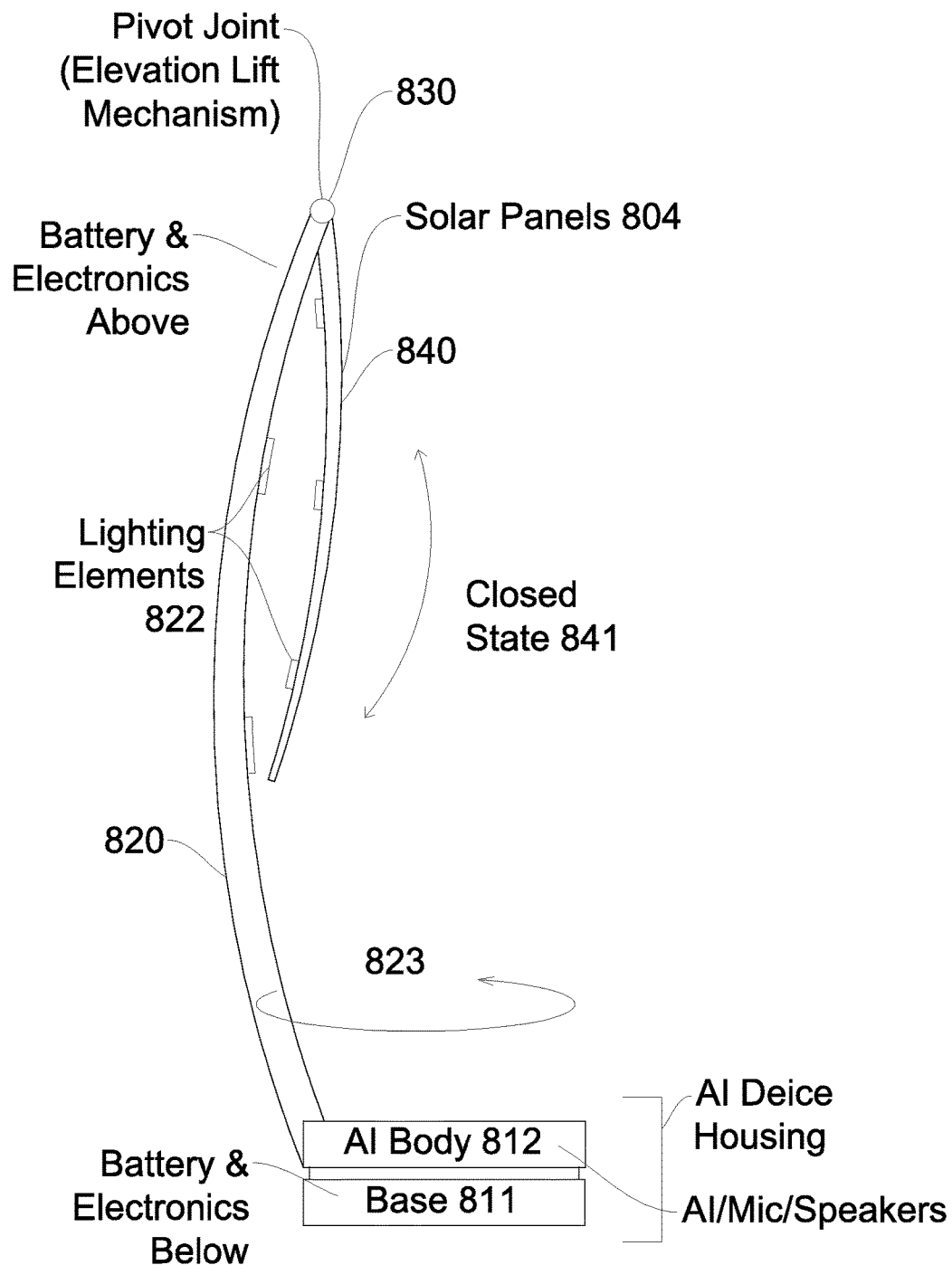
FIG. 9 illustrates an AI and lighting system using a cantilever design in a closed or retracted position according to embodiments.

In embodiments, a pivot joint assembly 830 may comprise an elevation lift mechanism to lift a cantilever lighting support frame 840 from a rest or closed position as shown in FIG. 9 to an open position as shown in FIG. 8. Reference number 842 illustrates a direction a cantilever lighting support frame 840 moves with respect to a cantilever support assembly 820. Reference number 841 illustrates a direction and a closed state of a cantilever AI and lighting system 800.

In embodiments, a pivot joint assembly 830 may comprise a worm gear assembly 833, one or more pulleys and/or one or more cables to raise a cantilever lighting support frame 840 from its resting position next to a cantilever lighting support assembly 829. In embodiments, a pivot joint assembly 830 may comprise a short length lever coupled and/or connected to a high torque actuator to move a lighting support frame 840 from its resting or closed position with respect to a cantilever lighting support assembly 820. In embodiments, motors may be utilized to drive either a worm gear, an elevation lifting mechanism and/or a high torque actuator. In embodiments, motor assemblies may be powered by and/or comprise a permanent magnet DC Motor, a Brushless DC Motor, and/or Stepper Motor.

In embodiments, a cantilever lighting support frame 840 may comprise one or more lighting elements and/or assemblies 822. In embodiments, a cantilever lighting support frame 840 may comprise one or more solar cells and/or solar arrays 804. In embodiments, a top surface of a lighting frame assembly may have one or more solar cells and/or solar arrays 804 positioned and/or installed thereon. In embodiments, a bottom surface and/or a top surface of a lighting support frame 840 may comprise one or more lighting elements and/or lighting assemblies 820. In embodiments, one or more lighting assemblies 820, located on a bottom surface of a lighting support frame 840 may provide illumination and/or light to an area underneath a cantilever AI device and lighting system 800 (and specifically a cantilever lighting support frame 840). In embodiments, one or more lighting assemblies 822 may be installed on a top surface of a lighting support frame 840 and may provide lighting and/or illumination in an area above portions of a AI device and lighting system 800 (e.g., a lighting support frame 840).

Figure 10:
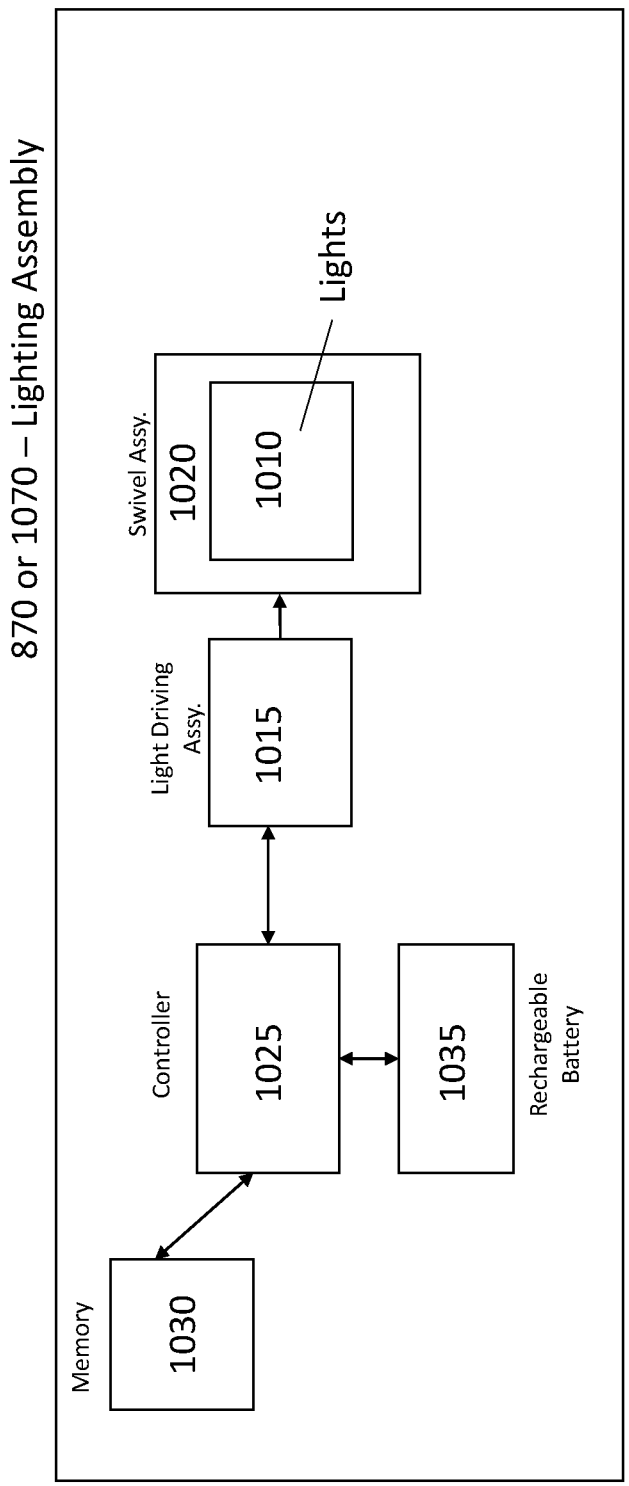
FIG. 10 illustrates a lighting subsystem in AI device and lighting systems according to embodiments.

FIG. 10 illustrates a lighting subsystem in AI device and lighting systems according to embodiments. In embodiments, an AI device and lighting system 1070 (such as those illustrated in FIGS. 1, 2, 5, 7 and 8) may comprising a lighting subsystem 870. In embodiments, a cantilever support assembly 820 may comprise a lighting subsystem 1070 installed therein and/or thereon. In embodiments, a solar panel charging system may transfer and/or provide power (e.g., voltage and/or current) to a lighting subsystem 1070.

In embodiments, a rechargeable battery 1035 may provide power (e.g., voltage and/or current) to a lighting subsystem 1070. In embodiments, a cantilever lighting support frame 840 may have a lighting subsystem 1070.

In embodiments, a lighting subsystem 1070 may comprise one or more lighting assemblies 1010 (e.g., LED lights), one or more lighting drivers and/or ballasts 1015, one or more processors/controllers 1025, one or more memories 1030. In embodiments, one or more lighting bulbs or elements 1010 may be activated and/or turned on via a manual switch. In embodiments, a controller or processor 811 in an AI device and lighting system 800, a processor/controller in a mobile communication device may communicate commands, instructions, messages and/or signals to a lighting assembly processor/controller 1017 to control activation and/or deactivation of one or more lighting assemblies or elements 1015 via one or more lighting drivers and/or ballasts 1016. In embodiments, a controller or processor in an AI device and lighting system 800 (or a processor/controller in a mobile communication device (e.g., smart phone) may communicate and/or transmit commands, instructions, messages and/or signals to a lighting subsystem 1070 based on different environmental conditions and/or situations obtained from sensors (e.g., it is a certain time of a day, there is no light due to cloud cover and/or darkness, or via voice commands that an AI device interprets, or an AI device and/or lighting object detects movement in an area—utilizing a proximity sensor). In embodiments, lighting assemblies 1010 may be integrated into or attached to a cantilever lighting support frame 840 and may direct light in a downward manner directly towards or at a certain angle to a ground surface. In embodiments, a lighting subsystem 1000 (e.g., one or more LED lights 1010) may be integrated into or installed within a cantilever support assembly 820. In these embodiments, one or more lighting assemblies 1010 may direct light and/or illumination in a horizontal or mainly horizontal direction (outward from a side of a cantilever support assembly 820) as is illustrated in FIG. 8.

In embodiments, a lighting system or subassembly 1070 may comprise a lighting assembly processor or controller 1025, a lighting ballast (or lighting driver) 1015 and one or more lighting elements (e.g., LED lights 1010). In embodiments, a lighting system or subsystem 1070 may comprise one or more filters (e.g., color filters to cause one or more lighting elements to illuminate an area in a different color (e.g., red, green, blue, and/or purple). In embodiments, when lighting elements (e.g., LED lights) 1010 may be turned on (and/or activated), one or more lighting elements (e.g., LED lights 1010) may direct light beams outward (e.g., in a horizontal direction) from a cantilever support assembly 820. In embodiments, one or more lighting elements 1010 (e.g., LED lights) may be directed at a 90 degree angle from a cantilever support assembly vertical axis. In embodiments, one or more lighting elements or assemblies 1010 (e.g., LED lights) may be installed in a swiveling assembly 1020 and lighting elements or bulbs 1015 (e.g., LED lights) may transmit or communicate light (or light beams) at an angle of 20 to 90 degrees from a cantilever support assembly 820 vertical axis.

In embodiments, a lighting subsystem 870 may comprise one or more processor or microcontroller 1025, one or more lighting drivers or ballasts 1015, one or more memories 1030, and/or one or more lighting elements (e.g., LED lights). In embodiments, one or more processor or microcontroller 1025, one or more lighting drivers or ballasts 1015 and one or more memories 1030, may be installed on lighting PCB. In embodiments, activation and deactivation of one or more lighting elements 1010 may be synchronous with music being played and/or reproduced by an audio transceiver may be controlled by commands, instructions, signals and/or messages received by one or more processors or microcontrollers 1025. In embodiments, a microcontroller or processor 1025 may communicate pulses of voltage and/or current to a lighting driver 1015, which in turn may communicate pulses of voltage and/or current to one or more lighting elements (e.g., LED lights 1010). In embodiments, communicating pulses of voltage and/or current to a lighting driver or ballast 1015 and/or one or more lighting elements (e.g., LED lights) 1010 may save power consumption in an AI device and lighting system 800, due to only providing power to one or more lighting elements 1010 for a smaller amount of time. This method may allow an AI device and lighting system 800 to conserve a large amount of energy when utilized or used in a dark environment (e.g., a night time). In embodiments, an AI device and lighting system 800 may conserve and/or save between 20 and 70 percent of power utilized. In embodiments, one or more LED light elements 1010 may be mounted on or installed within a cantilever support assembly 820. In embodiments, one or more lighting elements or bulbs 1010 may be directed to shine lines in an upward direction (e.g., more vertical direction) towards a cantilever lighting support frame 840. In embodiments, a bottom surface of a cantilever lighting support frame 840 may reflect light beams from one or more LED lights 1010 back to a surrounding area of an AI device and lighting system 800. In an embodiment, a cantilever lighting support frame 840 may have a reflective bottom surface to assist in reflecting light from lighting elements 1010 back to the shading area.

Figure 11:
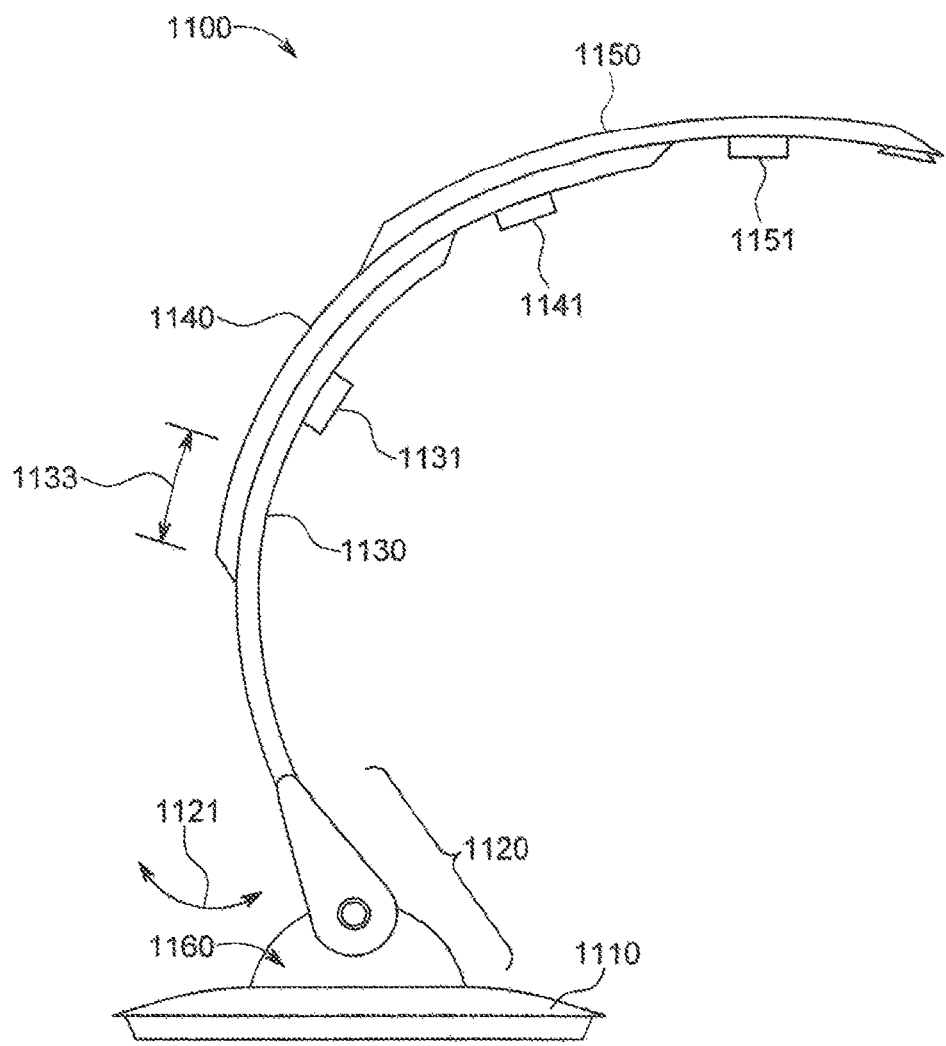
FIG. 11 illustrates a cantilever lighting assembly accordingly to embodiments.

FIG. 11 illustrates a cantilever lighting assembly accordingly to embodiments. In embodiments, a cantilever lighting assembly 1100 comprises a base assembly 1110, a pivot assembly 1120, a first cantilever support assembly 1130, a second cantilever support assembly 1140 and a third cantilever support assembly 1150. In embodiments, a rotation assembly 1160 may rotate about an azimuth axis with respect to a base assembly 1110. In embodiments, a hinging or pivot assembly 1120 may rotate with respect to a first cantilever support assembly 1130 (as shown by reference number 1121). Because a first cantilever support assembly 1130 is coupled and/or connected to a second cantilever support assembly 1140 and a third cantilever support assembly 1150, if one support assembly is elevated all of the cantilever support assemblies may be elevated. In embodiments, a first cantilever support assembly 1130 is connected and/or coupled to a second cantilever support assembly 1140 which is connected and/or coupled to a third cantilever support assembly 1150. In embodiments, cantilever support assemblies 1130 1140 1150 may be moved into an extended and/or deployed position (as shown in FIG. 11) utilizing motors, cables and/or worm gear assemblies. In embodiments, cantilever support assemblies 1130 1140 1150 may be moved into an extended and/or deployed position utilizing one or more motors, actuators and/or hinges. In embodiments, a first cantilever support assembly 1130 may comprise one or more lighting elements 1131, a second cantilever support assembly 1140 may comprise one or more lighting elements 1141 and/or a third cantilever support assembly 1150 may comprise one or more lighting elements 1151. In embodiments, cantilever support assemblies 1130 1140 and/or 1150 may move in a direction as identified by reference number 1133 to either expand/deploy or retract/close. In embodiments, components and/or assemblies in a base assembly 1110, a rotation assembly 1160 and/or a pivot assembly 1120 may operate in similar fashions to components and/or assemblies in AI device housings described in FIGS. 1, 2, 5 and 7.

Figure 12:
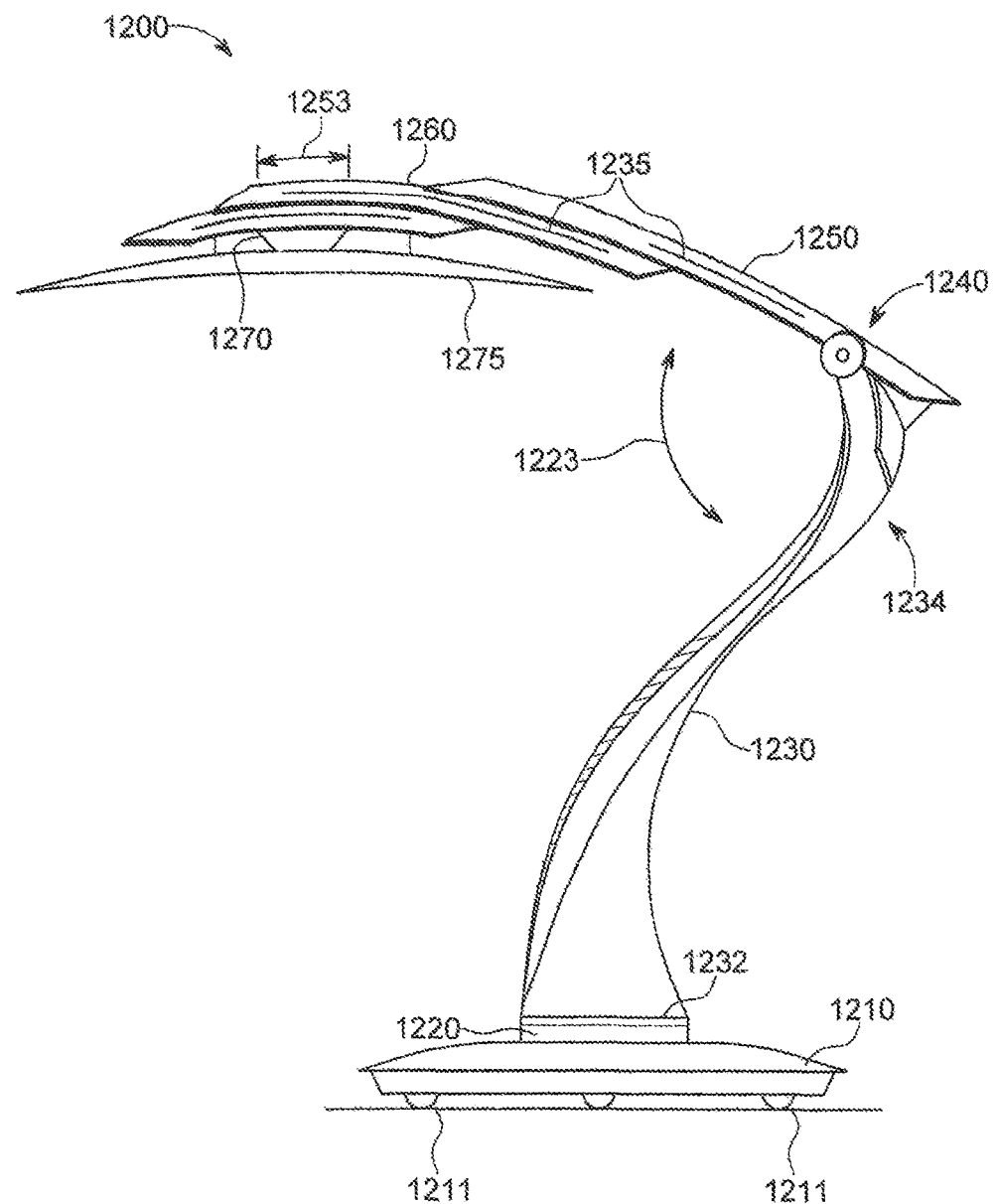
FIG. 12 illustrates a cantilever AI device and/or lighting system according to embodiments.

FIG. 12 illustrates a cantilever AI device and/or lighting system according to embodiments. In embodiments, a cantilever AI device and/or lighting system 1200 may comprise a base assembly 1210, a rotation assembly 1220, a support stem assembly 1230, a pivot assembly 1240, one or more cantilever support assemblies and/or one or more lighting assemblies 1250 1260 1270. In embodiments, a cantilever AI device and/or lighting system 1200 may further comprise one or more shading elements 1275. In embodiments, a cantilever AI device and/or lighting system comprises a first cantilever support assembly 1250 and/or a second cantilever support assembly 1260. In embodiments, a base assembly 1210 may comprise one or more wheels 1211. In embodiments, a base assembly 1210 may operate in a similar fashion to a movable base assembly as described in FIGS. 7A, 7B, 7C and/or 7D. In embodiments, a rotation assembly 1220 may rotate about an azimuth axis with respect to a base assembly 1210. In embodiments, a rotation assembly 1220 and/or a support stem assembly 1230 may comprise a motor, a shaft and/or one or more gearing assemblies. In embodiments, if a rotation assembly rotates about an azimuth axis, so does a support stem assembly 1230, a pivot assembly 1240, a first cantilever support assembly 1250, a second cantilever support assembly 1260 and/or one or more lighting assembly 1270. In embodiments, one or more cantilever support assemblies 1250 and/or 1260 may be elevated, may be rotated, and/or may pivot about a pivot assembly 1240 with respect to a support stem assembly 1230 as is illustrated by reference number 1223. In embodiments, elevation and/or rotation of cantilever support assemblies 1250 1360 with respect to a support stem assembly 1230 may utilize one or more actuators 1234, hinging assemblies, gearing assemblies and/or motors. In embodiments, one or more motors, one or more cables and/or one or more gearing assemblies may be utilized to elevate and/or rotate cantilever support assemblies 1250 1260 with respect to a support stem assembly 1230. In embodiments, a first cantilever support assembly 1250 may move with respect to a second cantilever support assembly 1260 (as shown by reference number 1253) utilizing one or more motors, one or more actuators, one or more hinging assemblies and/or one or more gearing assemblies. In embodiments, a first cantilever support assembly 1250 may move with respect to a second cantilever support assembly 1260 (as shown by reference number 1253) utilizing one or more motors, one or more cables and/or one or gearing assemblies. In embodiments, one or more cantilever support assemblies (e.g., 1260) may be coupled and/or connected to one or more lighting assemblies 1273. In embodiments, one or more cantilever support assemblies (e.g., 1260) may be coupled and/or connected to one or more shading elements or fabric shades 1275. In embodiments, components and/or assemblies in a base assembly 1210, a rotation assembly 1220 and/or a support stem assembly 1230 may operate in similar fashions to components and/or assemblies in AI device housings described in FIGS. 1, 2, 5 and 7.

In embodiments, a lighting assembly comprises: a lighting support frame and lighting fabric; a lighting support assembly connected to the lighting support frame and lighting fabric, the lighting support frame or the lighting support assembly comprising one or more lighting elements; and an artificial intelligence (AI) device housing coupled to the lighting support assembly.

In embodiments, the AI device housing comprises: one or more microphones; one or more processors; one or more memory devices; and computer-readable instructions stored in the one or more memory devices and executable by the one or more processors to: receive audible commands; and convert the received audible commands to one or more sound files. In embodiments, the lighting assembly further includes a wireless transceiver, the computer-readable instructions further executable by the one or more processors to: communicate the one or more sound files, via the wireless transceiver, to an external computing device for voice recognition; and receive one or more recognized device commands, via the wireless transceiver, the recognized one or more device commands to be based, at least in part, on the communicated one or more sound files.

In embodiments, the computer-readable instruction further executable by the one or more processors to: perform voice-recognition on the converted one or more sound files to generate one or more device commands. In embodiments, the received recognized device command is related to operation of a camera, and the computer-readable instructions are further executable by the one or more processors to: activate the camera to initiate capture of images or video around the lighting assembly. In embodiments, the received recognized device command is related to operation of one or more sensors, and the computer-readable instructions further executable by the one or more processors to activate the one or more sensors to capture sensor measurements from an area surrounding the lighting assembly.

In embodiments, the received recognized device command is related to operation of the one or more lighting elements, and the computer-readable instructions further executable by the one or more processors to activate the one or more lighting elements. In embodiments, the received recognized device commands is related to operation of an audio system, the computer-readable instructions further executable by the one or more processors to activate the audio system to play audio music files In embodiments, the audio files are received, via the wireless transceiver, from an external computing device. In embodiments, the one or more microphones are integrated with the AI device housing. In embodiments, the wireless transceiver is a WiFi communications transceiver or a cellular communication transceiver.

In embodiments, a base assembly coupled to the AI device housing and the base assembly is movable and includes wheels. In embodiments, the AI device housing is rotatable with respect to the base assembly. In embodiments, the lighting support assembly is rotatable with respect to the AI device housing. In embodiments, the AI device housing includes an imaging device to capture images of an area around the lighting assembly.

In embodiments, a lighting assembly, includes an artificial intelligence (AI) body housing; a cantilever support assembly connected to the AI body housing; a pivoting assembly connected to the cantilever support assembly; and a cantilever lighting assembly connected to the pivoting assembly, the cantilever lighting assembly to comprise one or more lighting elements on a first surface and one or more solar panels on a second surface, wherein the pivoting assembly to lift the cantilever support assembly to a deployed position. In embodiments, the cantilever support assembly further includes one or more lighting elements. In embodiments, the AI body housing comprising one or more microphones; one or more processors; one or more memory devices; and computer-readable instructions stored in the one or more memory devices and executable by the one or more processors to: receive audible commands via the one or more microphones; and convert the received audible commands to one or more sound files. In embodiments, the lighting assembly further includes a rotation assembly, the rotation assembly connected to the AI body housing and the cantilever support assembly and rotating the cantilever support assembly about the AI body housing.

In embodiments, a computing device may be a server, a computer, a laptop computer, a mobile computing device, a mobile communications device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or a modular umbrella shading system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Non-volatile storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Non-volatile storage medium/media can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, Windows Phone, Google Phone, Amazon Phone, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in machine-readable form. By way of example, and not limitation, a computer-readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. A lighting assembly, comprising:
a lighting support frame and lighting fabric;
a lighting support assembly connected to the lighting support frame and lighting fabric, the lighting support frame or the lighting support assembly comprising one or more lighting elements;
an artificial intelligence (AI) device housing coupled to the lighting support assembly, the AI device housing comprising:
one or more microphones;
one or more processors;
one or more memory devices; and
computer-readable instructions stored in the one or more memory devices and executable by the one or more processors to:
receive audible commands; and
convert the received audible commands to one or more sound files; and
a wireless transceiver,
the computer-readable instructions further executable by the one or more processors to:
communicate the one or more sound files, via the wireless transceiver, to an external computing device for voice recognition; and
receive one or more recognized device commands, via the wireless transceiver, the recognized one or more device commands to be based, at least in part, on the communicated one or more sound files.

2. The lighting assembly of claim 1, wherein the received recognized device command is related to operation of a camera,
the computer-readable instructions further executable by the one or more processors to: activate the camera to initiate capture of images or video around the lighting assembly.

3. The lighting assembly of claim 1, wherein the received recognized device command is related to operation of one or more sensors,
the computer-readable instructions further executable by the one or more processors to activate the one or more sensors to capture sensor measurements from an area surrounding the lighting assembly.

4. The lighting assembly of claim 1, wherein the received recognized device command is related to operation of the one or more lighting elements,
the computer-readable instructions further executable by the one or more processors to activate the one or more lighting elements.

5. The lighting assembly of claim 1, wherein the received recognized device commands is related to operation of an audio system,
the computer-readable instructions further executable by the one or more processors to activate the audio system to play audio music files.

6. The lighting assembly of claim 5, wherein the audio files are received, via the wireless transceiver, from an external computing device.

7. The lighting assembly of claim 1, wherein the one or more microphones are integrated with the AI device housing.

8. The lighting assembly of claim 1, wherein the wireless transceiver is a WiFi wireless communications transceiver.

9. The lighting assembly of claim 1, wherein the wireless transceiver is a wireless cellular communication transceiver.

10. The lighting assembly of claim 1, further including a base assembly coupled to the AI device housing.

11. The lighting assembly of claim 10, the base assembly comprising wheels, wherein the base assembly is a movable base assembly.

12. The lighting assembly of claim 10, wherein the AI device housing is rotatable with respect to the base assembly.

13. The lighting assembly of claim 1, wherein the lighting support assembly is rotatable with respect to AI device housing.

14. The lighting assembly of claim 1, the AI device housing further comprising an imaging device to capture images of an area around the lighting assembly.

15. A lighting assembly, comprising:
an artificial intelligence (AI) body housing, the AI body housing comprising one or more microphones; one or more processors; one or more memory devices; and computer-readable instructions executable by the one or more processors to
receive audible commands; and
convert the received audible commands to one or more sound files; and;
a cantilever support assembly connected to the AI body housing;

a pivoting assembly connected to the cantilever support assembly; and a cantilever lighting assembly connected to the pivoting assembly, the cantilever lighting assembly to comprise one or more lighting elements on a first surface and one or more solar panels on a second surface, wherein the pivoting assembly to lift the cantilever support assembly to a deployed position; and a wireless transceiver, the computer-readable instructions further executable by the one or more processors to:

communicate the one or more sound files, via the wireless transceiver, to an external computing device for voice recognition; and receive one or more recognized device commands, via the wireless transceiver, the recognized one or more device commands to be based, at least in part, on the communicated one or more sound files.

16. The lighting assembly of claim 15, the cantilever support assembly further comprising one or more lighting elements.

17. The lighting assembly of claim 15, further comprising a rotation assembly, the rotation assembly connected to the AI body housing and the cantilever support assembly and rotating the cantilever support assembly about the AI body housing.

18. A lighting assembly, comprising:

a lighting support frame;

a lighting support assembly connected to the lighting support frame and lighting fabric, the lighting support frame or the lighting support assembly comprising one or more lighting elements;

an artificial intelligence (AI) device housing coupled to the lighting support assembly, the AI device housing comprising:

one or more microphones;

one or more processors;

one or more memory devices; and computer-readable instructions stored in the one or more memory devices and executable by the one or more processors to:

receive audible commands; and convert the received audible commands to one or more sound files; and a wireless transceiver, the computer-readable instructions further executable by the one or more processors to:

communicate the one or more sound files, via the wireless transceiver, to an external computing device for voice recognition; and receive one or more recognized device commands, via the wireless transceiver, the recognized one or more device commands to be based, at least in part, on the communicated one or more sound files.

* * * * *